United States Patent
Trembley et al.

(10) Patent No.: US 11,071,305 B2
(45) Date of Patent: Jul. 27, 2021

(54) CRYOGENIC POULTRY CHILLING SYSTEM AND METHOD

(71) Applicant: AIR PRODUCTS AND CHEMICALS, INC., Allentown, PA (US)

(72) Inventors: Jean-P. Trembley, Surrey (GB); Nigel Cope, Berks (GB)

(73) Assignee: Air Products and Chemicals, Inc., Allentown, PA (US)

( * ) Notice: Subject to any disclaimer, the term of this patent is extended or adjusted under 35 U.S.C. 154(b) by 902 days.

(21) Appl. No.: 14/760,742

(22) PCT Filed: Jul. 24, 2014

(86) PCT No.: PCT/US2014/047998
§ 371 (c)(1),
(2) Date: Jul. 14, 2015

(87) PCT Pub. No.: WO2015/013504
PCT Pub. Date: Jan. 29, 2015

(65) Prior Publication Data
US 2015/0366229 A1    Dec. 24, 2015

Related U.S. Application Data

(60) Provisional application No. 61/858,438, filed on Jul. 25, 2013.

(51) Int. Cl.
*A23B 7/04*     (2006.01)
*A23L 3/36*     (2006.01)
(Continued)

(52) U.S. Cl.
CPC .......... *A23B 7/0416* (2013.01); *A22B 5/0076* (2013.01); *A22C 21/00* (2013.01);
(Continued)

(58) Field of Classification Search
CPC ... A22B 5/0076; A22C 21/00; A22C 21/0061; A23B 4/062; A23B 4/09; A23B 7/0416; A23L 3/361; A23L 3/375; F25D 3/11
(Continued)

(56) References Cited

U.S. PATENT DOCUMENTS 2,314,317 A     7/1940  Walter
3,703,744 A  *  11/1972 Dillon ................. A22C 21/04
                                            432/230

(Continued)

FOREIGN PATENT DOCUMENTS

EP   0923883 A2   6/1999
WO   96/22495 A1  7/1996
WO   01/37674 A1  5/2001

*Primary Examiner* — Edward F Landrum
*Assistant Examiner* — Melodee Jefferson
(74) *Attorney, Agent, or Firm* — Larry S. Zelson

(57) ABSTRACT

A cryogenic poultry chilling system including a rotatable carousel having a plurality of stations each configured and arranged to receive a poultry carcass suspended from leg hangers, the poultry carcass having an upward facing cavity opening and a downward facing neck opening, a tundish having an outlet port corresponding to each of the stations, and an injector extending downwardly from each of the tundish outlet ports configured and arranged to deliver cryogen into the cavity opening of a carcass in the corresponding station, and a cryogen delivery apparatus configured to deliver substantially liquid cryogen into the tundish.

14 Claims, 14 Drawing Sheets

(51) Int. Cl.
*A23L 3/375* (2006.01)
*A23B 4/06* (2006.01)
*A23B 4/09* (2006.01)
*F25D 3/11* (2006.01)
*A22B 5/00* (2006.01)
*A22C 21/00* (2006.01)

(52) U.S. Cl.
CPC .......... *A22C 21/0061* (2013.01); *A23B 4/062* (2013.01); *A23B 4/09* (2013.01); *A23L 3/361* (2013.01); *A23L 3/375* (2013.01); *F25D 3/11* (2013.01)

(58) Field of Classification Search
USPC ............. 62/340, 374, 378, 379, 63; 452/185
See application file for complete search history.

(56) References Cited

U.S. PATENT DOCUMENTS

| | | | | |
|---|---|---|---|---|
| 3,803,669 A | * | 4/1974 | Dillon | A22C 21/0061 452/106 |
| 3,930,282 A | * | 1/1976 | Martin | A22C 21/0092 452/116 |
| 3,986,231 A | * | 10/1976 | Harben, Jr. | A22C 21/0007 452/118 |
| 4,015,440 A | * | 4/1977 | Pietrucha | C01B 31/22 141/284 |
| 4,019,222 A | * | 4/1977 | Scheier | A22C 21/06 452/117 |
| 4,155,146 A | * | 5/1979 | Meyn | A22B 5/0094 452/109 |
| 4,164,129 A | * | 8/1979 | Stueber | A23L 3/361 62/302 |
| 4,265,001 A | * | 5/1981 | Hathorn | A22B 5/0094 452/120 |
| 4,283,813 A | * | 8/1981 | House | A22C 21/0007 452/106 |
| 4,367,630 A | * | 1/1983 | Bernard | A23B 4/062 62/63 |
| 4,486,920 A | * | 12/1984 | Tieleman | A22B 5/0094 452/109 |
| 4,574,428 A | * | 3/1986 | Meyn | A22C 21/0053 198/468.2 |
| 4,616,380 A | * | 10/1986 | Tieleman | A22C 21/0046 452/149 |
| 4,669,148 A | * | 6/1987 | Scheier | A22C 21/0023 452/165 |
| 4,675,943 A | * | 6/1987 | Tabata | A22C 21/0053 198/680 |
| 4,876,767 A | * | 10/1989 | Harben, III | A22C 21/0061 452/106 |
| 4,920,762 A | * | 5/1990 | Beckstead | F41J 1/01 249/161 |
| 4,989,416 A | * | 2/1991 | Miller | A23L 3/361 62/381 |
| 5,080,630 A | * | 1/1992 | Tieleman | B65G 35/06 452/165 |
| 5,218,826 A | * | 6/1993 | Kirschner | A23L 3/361 62/434 |
| 5,220,812 A | * | 6/1993 | Palbiski | A23B 7/0433 62/381 |
| 5,482,503 A | * | 1/1996 | Scott | A22C 21/0061 452/173 |
| 5,487,700 A | * | 1/1996 | Dillard | A22C 21/0007 452/179 |
| 5,569,072 A | * | 10/1996 | Tieleman | A22C 21/06 452/117 |
| 6,093,093 A | * | 7/2000 | Mostoller | A22C 21/0061 452/123 |
| 6,167,709 B1 | | 1/2001 | Caracciolio, Jr. et al. | |
| 6,190,250 B1 | * | 2/2001 | Volk | A22B 5/0094 452/177 |
| 6,193,595 B1 | * | 2/2001 | Volk | A22B 5/0094 452/117 |
| 6,381,967 B1 | * | 5/2002 | Craig | A01N 1/02 34/284 |
| 6,481,220 B2 | * | 11/2002 | Butler | A23B 4/064 62/64 |
| 6,931,864 B2 | * | 8/2005 | Fuhr | A01N 1/02 435/307.1 |
| 7,083,510 B2 | * | 8/2006 | Caracciolo, Jr. | A22C 21/0061 452/81 |
| 7,261,629 B2 | * | 8/2007 | Holleman | A22C 21/0084 452/135 |
| 7,288,274 B2 | * | 10/2007 | Hilgren | A22C 21/0061 426/332 |
| 8,308,342 B2 | * | 11/2012 | Cabrales | B01F 7/00708 366/325.2 |
| 9,146,150 B2 | * | 9/2015 | van den Berg | A22C 21/00 |
| 2002/0058470 A1 | * | 5/2002 | Schmidt | A22C 21/0053 452/182 |
| 2004/0241295 A1 | * | 12/2004 | van den Nieuwelaar | A23B 4/062 426/326 |
| 2007/0292559 A1 | * | 12/2007 | Garwood | A22B 5/0029 426/2 |
| 2009/0285520 A1 | * | 11/2009 | Kaplan | G01M 11/083 385/12 |
| 2010/0317272 A1 | * | 12/2010 | Hazenbroek | A22C 21/0023 452/125 |
| 2013/0326998 A1 | * | 12/2013 | Hartwig | B29B 11/14 53/453 |

* cited by examiner

CRYOGENIC POULTRY CHILLING SYSTEM AND METHOD

BACKGROUND

This application relates to a system and method for chilling poultry carcasses, and more particularly to an inline system and method for chilling poultry carcasses by injection of a cryogenic fluid into the cavity.

Particularly in certain countries, many poultry (e.g., chicken) processors are suffering from a shortage of refrigeration, driven both by the capital cost of refrigeration equipment and the availability of electric power, and this has a big impact on their processing operations. Many are struggling to meet chilling requirements, which means out-of-spec product and reduced production rates, thus leading to longer working hours and increased labor costs. Additionally, existing chilling equipment provides cooling to the external surface of a poultry carcass, which may not be the most efficient means of heat transfer.

Currently, poultry processing is done inline and includes a final inspection or Lo-Vac machine in one stage of the process. Poultry carcasses (e.g., broilers) enter the machine, which has a plurality of rotating stations guided by a conical cam. A leg loop positions the carcass correctly for entry of the a suction probe, and the probe enters the carcass cavity. Once the probe nozzles reach the bottom of the cavity, vacuum is applied and the nozzles remove lungs and any loose debris. Vacuum is switched off and the suction probe is drawn out of the carcass. All units are washed before the next cycle begins.

SUMMARY

Described herein is an in-line cryogenic chilling system and method for chilling of poultry carcasses to ensure final bird chilling is within the required specification. The system may be incorporated into a modified poultry final inspecting machine that is adapted for cryogen injection, or may be constructed as an entirely new machine. A specially configured cryogen injection apparatus directly injects cryogen into the cavity to provide rapid chilling, as well as potential bacterial reduction in poultry.

Aspect 1. A cryogenic poultry chilling system comprising: a rotatable carousel including: a plurality of stations each configured and arranged to receive a poultry carcass suspended from leg hangers, the poultry carcass having an upward facing cavity opening and a downward facing neck opening; a tundish having an outlet port corresponding to each of the stations; and an injector extending downwardly from each of the tundish outlet ports configured and arranged to deliver cryogen into the cavity opening of a carcass in the corresponding station; and a cryogen delivery apparatus configured to deliver substantially liquid cryogen into the tundish.

Aspect 2. The cryogenic poultry chilling system of Aspect 1, the tundish comprising: an outer region lower than a central region, the outer region being bounded by a perimeter edge; and a raised rim extending upward from the perimeter edge; wherein the outlet ports are positioned near the perimeter edge of the tundish.

Aspect 3. The cryogenic poultry chilling system of Aspect 2, the tundish further comprising: a baffle corresponding to each outlet port configured and arranged to direct cryogen through the corresponding outlet port as the carousel is rotating.

Aspect 4. The cryogenic poultry chilling system Aspect 2, wherein the outlet ports are substantially evenly spaced along the perimeter edge.

Aspect 5. The cryogenic poultry chilling system of any of the preceding Aspects, the cryogen delivery apparatus comprising: a cryogen degassing tank configured and arranged to receive a mixture of cryogenic liquid and gas and to deliver cryogen substantially as liquid to the tundish.

Aspect 6. The cryogenic poultry chilling system of any of the preceding Aspects, the carousel further comprising: guide member at each station positioned around at least a portion of the corresponding injector configured and arranged to maintain the cavity opening aligned with the injector.

Aspect 7. The cryogenic poultry chilling system of any of the preceding Aspects, further comprising: an upper rail positioned above the carousel and running substantially parallel to a portion of the perimeter edge of the tundish configured and arranged to support trolleys from which the carcass leg hangers are suspended.

Aspect 8. The cryogenic poultry chilling system of Aspect 7, the carousel further comprising: a trolley guide positioned below the upper rail and above the tundish rim and having a plurality of perimeter notches configured and arranged to position the support trolleys, each notch corresponding to one of the stations, such that the carcass corresponding to each support trolley is positioned with its cavity opening aligned with the injector in the respective station.

Aspect 9. The cryogenic poultry chilling system of Aspect 7, further comprising: a lower rail positioned below the upper rail and above the tundish rim and running parallel to the upper rail configured and arranged to guide the leg hangers that are suspended from the support trolleys.

Aspect 10. The cryogenic poultry chilling system of any of the preceding Aspects, further comprising: a neck clamping apparatus configured and arranged to at least partially close the neck opening to inhibit loss of cryogen therefrom.

Aspect 11. A cryogenic poultry chilling system comprising: a stationary portion; a carousel including a plurality of stations each configured and arranged to receive a poultry carcass suspended by leg hangers, the carousel being rotatable with respect to the stationary portion, each of the stations comprising a cryogen injector; a cryogen delivery apparatus configured and arranged to deliver substantially liquid cryogen to the cryogen injectors; and an alignment mechanism including a top rail on the stationary portion configured and arranged to align the relative position of the cryogen injector and the carcass in each station for the cryogen injector to deliver cryogen into a cavity opening of the carcass.

Aspect 12. A method of chilling poultry using a cryogen, comprising: rotating at a predetermined speed a carousel having a plurality of stations each configured and arranged to receive a poultry carcass suspended from leg hangers; receiving a poultry carcass at one of the stations such that a cavity opening of the carcass is oriented generally upward and a neck opening of the carcass is oriented generally downward; delivering a dose substantially liquid cryogen to an injector corresponding to one of the stations; and delivering liquid cryogen by gravity from the injector into the carcass through the cavity opening.

Aspect 13. The method of chilling poultry of Aspect 12, further comprising: controlling the dose by one or both of controlling the flow rate cryogen delivered to the injector and controlling the predetermined speed of rotation of the carousel.

Aspect 14. The method of Aspect 12 or Aspect 13, further comprising: prior to delivering a dose of substantially liquid cryogen, degassing cryogen received from a cryogen source.

Aspect 15. The method of any of Aspects 12 to 14, further comprising: controlling the liquid cryogen delivered to each bird so as to cause at least some liquid cryogen to reach the neck opening, thereby reducing the presence of campylobacter at the neck opening.

Aspect 16. A cryogenic poultry chilling system comprising: a stator including a circular top cam rail and a circular bottom cam rail; and a carousel including at least one station configured and arranged to receive a poultry carcass suspended from leg hangers, the carousel being rotatable with respect to the stator; the at least one station comprising: a cryogen injection assembly including a spray pipe having a top cam follower at an upper end of the spray pipe configured and arranged to ride on the top cam rail of the stationary base, and a spray head at a lower end of the spray pipe, the spray head including a valve configured to open when the spray pipe contains cryogen at a pressure greater than a preset cracking pressure; and an interlock mechanism configured to be actuated by the presence of a poultry carcass in the station such that when the interlock mechanism is not actuated, the interlock mechanism prevents actuation of the cryogen injection assembly to an inserted position and prevents opening of the valve in the spray head even when the spray pipe contains cryogen at a pressure greater than the present cracking pressure.

Aspect 17. The cryogenic poultry chilling system of Aspect 16, the top cam rail including an upper top surface and a lower top surface, wherein when the top cam follower rides on the upper top surface the cryogen injection assembly is in a retracted position and when the top cam follower rides on the lower top surface the cryogen injection assembly is in a fully inserted position.

Aspect 18. The cryogenic poultry chilling system of Aspect 17, the top cam rail further including an intermediate top surface, wherein when the top cam follower rides on the intermediate top surface the cryogen injection assembly is in a partially inserted position.

Aspect 19. The cryogenic poultry chilling system of any of Aspects 16 to 18, further comprising: a rotatable joint for transferring cryogen from a cryogen inlet pipe on the stator to the cryogen injection assembly on the at least one station.

Aspect 20. The cryogenic poultry chilling system of any of Aspects 16 to 19, the interlock mechanism comprising: a hingedly mounted interlock member; and a injector support member; wherein in the absence of a poultry carcass in the station, the interlock mechanism is biased so that the injector support member is positioned beneath the valve and supports the cryogen injection assembly; and wherein in the presence of a poultry carcass in the station, the interlock mechanism is pivoted so that the injector support member is positioned away from the valve and the cryogen injection assembly can move freely downward.

Aspect 21. The cryogenic poultry chilling system of any of Aspects 16 to 20, further comprising: a clamping assembly including a base rigidly mounted to the carousel, a neck clamp pivotably mounted to the base, and a bottom cam follower configured and arranged to ride on the bottom cam rail of the stationary base and positioned to cause the neck clamp to pivot with respect to the base; the bottom cam rail including an upper top surface and a lower top surface, wherein when the bottom cam follower rides on the upper top surface the clamping assembly is in an released position and when the bottom cam follower rides on the lower top surface the clamping assembly is in a clamped position.

Aspect 22. The cryogenic poultry chilling system of Aspect 21, the clamping assembly further comprising a clamping ring rigidly mounted to the carousel so as to be on an opposite side of a poultry carcass neck as the neck clamp when a poultry carcass is present in the station.

Aspect 23. The cryogenic poultry chilling system of any of Aspects 16 to 22, further comprising: a shield mounted to the spray pipe above the spray head and positioned so as to inhibit sprayed cryogen from exiting the poultry carcass.

Aspect 24. The cryogenic poultry chilling system of Aspect 23, wherein the shield is corrugated to permit cold cryogen vapor to be exhausted so as to flow by gravity along outer surfaces of the poultry carcass.

Aspect 25. The cryogenic poultry chilling system of any of Aspects 16 to 23, further comprising: a vacuum assembly for removing gaseous cryogen after it has exited the carcass cavity.

Aspect 26. A method of chilling poultry using a cryogen, comprising: receiving a poultry carcass at a station such that a cavity opening of the carcass is oriented generally upward and a neck opening of the carcass is oriented generally downward, the cavity opening and neck opening both opening into a cavity in the carcass; inserting a cryogen injection assembly into the cavity through the cavity opening; commencing cryogen flow into the cavity as the cryogen injection assembly is being inserted into the cavity; continuing cryogen flow into the cavity; retracting the cryogen injection assembly from the cavity through the cavity opening; and ceasing cryogen flow into the cavity when the cryogen injection assembly is retracted from the cavity.

Aspect 27. The method of Aspect 26, further comprising: prior to inserting the cryogen injection assembly, detecting the presence of a poultry carcass at the station; and once the presence of the poultry carcass is detected, releasing the cryogen injection assembly for insertion into the cavity and enabling flow of cryogen.

Aspect 28. The method of Aspect 27, further comprising: detecting the absence of a poultry carcass at the station; and in the absence of a poultry carcass in the station, retaining the cryogen injection assembly in a retracted position and preventing flow of cryogen.

Aspect 29. The method of any one of Aspects 26 to 28, further comprising: at least partially clamping the neck opening substantially simultaneously with inserting the cryogen injection assembly, so as to inhibit cryogen from exiting through the neck opening.

Aspect 30. The method of Aspect 28, further comprising: unclamping the neck opening substantially simultaneously with retracting the cryogen injection assembly.

Aspect 31. The method of any one of Aspects 26 to 30, further comprising: at least partially blocking the cavity opening to inhibit cryogen liquid from spraying out therethrough, while allowing cold cryogen vapor/gas to exit and flow by gravity downward along outer surfaces of the carcass.

Aspect 32. The method of any one of Aspects 26 to 31, further comprising: applying vacuum to remove gaseous cryogen exiting from the carcass cavity.

Aspect 33. An inline cryogenic poultry chilling system comprising: a stator including a substantially circular top cam rail having an upper top surface and a lower top surface, and a substantially circular bottom cam rail having an upper top surface and a lower top surface; a carousel including at least one station, the carousel being rotatable with respect to the stator; and a rotatable joint for transferring cryogen from the cryogen inlet pipe to the carousel; the at least one station comprising: a cryogen inlet pipe configured and arranged to receive cryogen from the rotatable joint; a cryogen injection assembly including a spray pipe having a top cam follower at an upper end of the spray pipe configured and arranged to ride on the top cam rail of the stationary base, a spray head at a lower end of the spray pipe including a valve configured to open when the spray pipe contains cryogen at a pressure greater than a preset cracking pressure, and a corrugated shield mounted to the spray head pipe above the spray head; an interlock mechanism configured to be actuated by the presence of a poultry carcass in the station such that when the interlock mechanism is not actuated, the interlock lever prevents movement of the cryogen injection assembly to an inserted position and prevents opening of the valve in the spray head even when the spray pipe contains cryogen at a pressure greater than the cracking pressure; and a clamping assembly including a base rigidly mounted to the carousel, a clamping ring positioned so as to be on one side of a poultry carcass neck, a neck clamp pivotably mounted to the base so as to be on an opposite side of a poultry carcass neck, and a bottom cam follower riding on the bottom cam rail and positioned to cause the neck clamp to pivot with respect to the base toward the clamping ring; wherein when a poultry carcass is received by the at least one station with its cavity opening oriented upward and its neck opening oriented downward, the interlock mechanism detects the presence of the carcass and permits movement of the cryogen injection assembly toward the inserted position and opening of the valve in the spray head; wherein as the carousel rotates with a poultry carcass present in the station, the top cam follower rides from the upper top surface to the lower top surface of the top cam, causing the spray head to be inserted into the poultry cavity and causing the shield to at least partially block off the cavity opening, and the bottom cam follower rides from the lower top surface to the upper top surface of the bottom cam, causing the neck clamp to pivot toward the base, thereby clamping the neck of the bird between the neck clamp and the clamping ring to at least partially close the neck opening; wherein cryogen is at least partially prevented from escaping the bird cavity through the neck opening due to the clamping assembly, wherein cryogen liquid is prevented from splashing out of the cavity opening by the shield, and wherein cold cryogen vapor is enabled to exit the cavity opening through the cavity opening via gaps created by corrugations in the shield such that the cold cryogen vapor flows by gravity down along the outer surfaces of the poultry carcass; wherein when the carousel rotates further, the top cam follower rides from the lower top surface to the upper top surface of the top cam, causing the spray head to be removed from the cavity and the interlock mechanism cause the flow of cryogen form the spray head valve to be stopped, and the bottom cam follower rides from the upper top surface to the lower top surface of the bottom cam, causing the neck clamp to pivot away from the base, thereby releasing the neck of the bird; and wherein when the poultry carcass is removed from the at least one station, the interlock mechanism detects the absence of the carcass and prevents movement of the cryogen assembly until another poultry carcass is received.

The various aspects of the system disclosed herein can be used alone or in combinations with each other.

DETAILED DESCRIPTION

Figure 1:
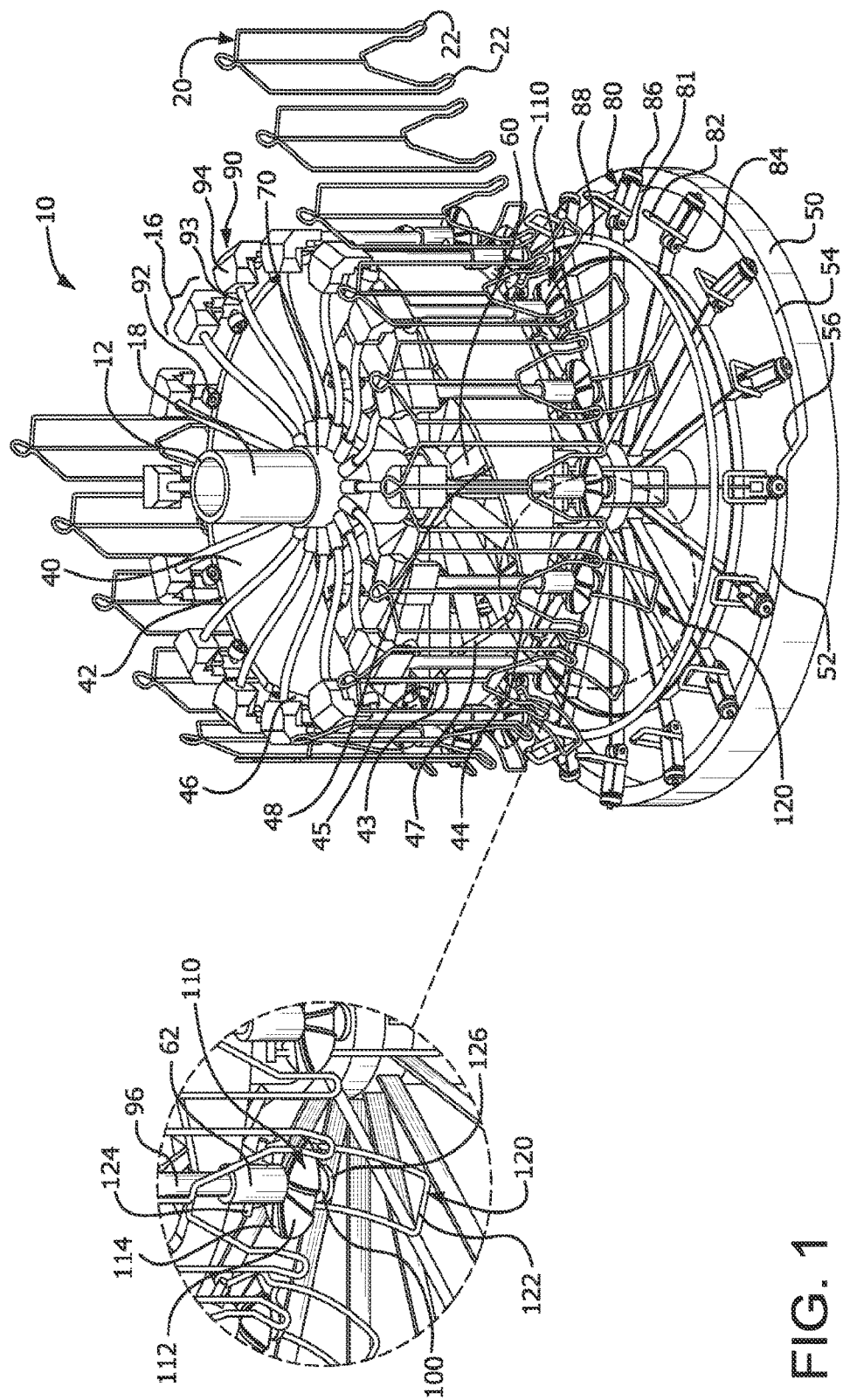
FIG. 1 is a perspective view of one embodiment of a poultry chilling system.
Figure 2:
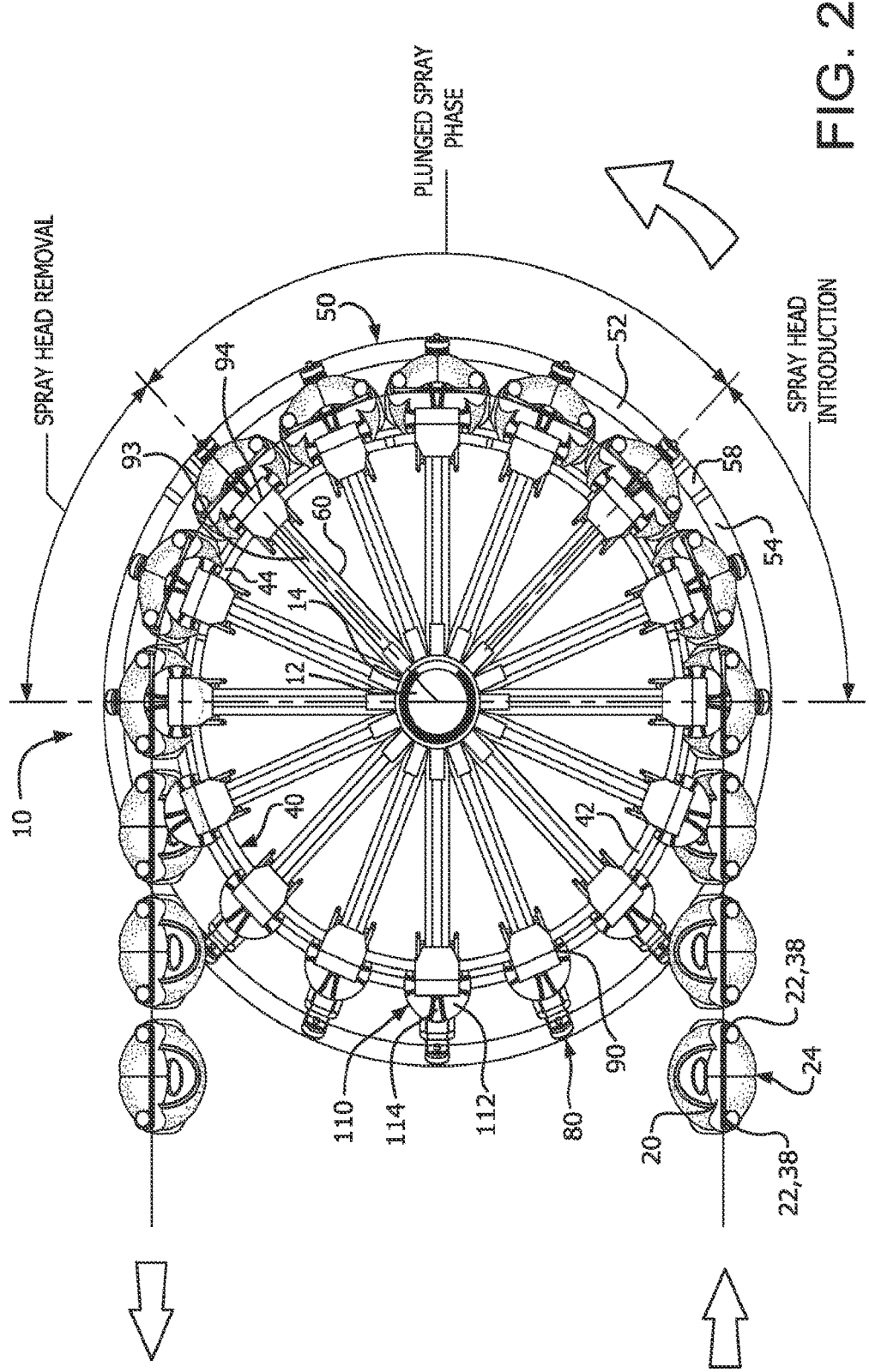
FIG. 2 is a top view of the embodiment of a poultry chilling system as in FIG. 1, showing the movement of poultry carcasses through the system, including steps of inserting a cryogen injection assembly, spraying cryogen, and removing the cryogen injection assembly.
Figure 3:
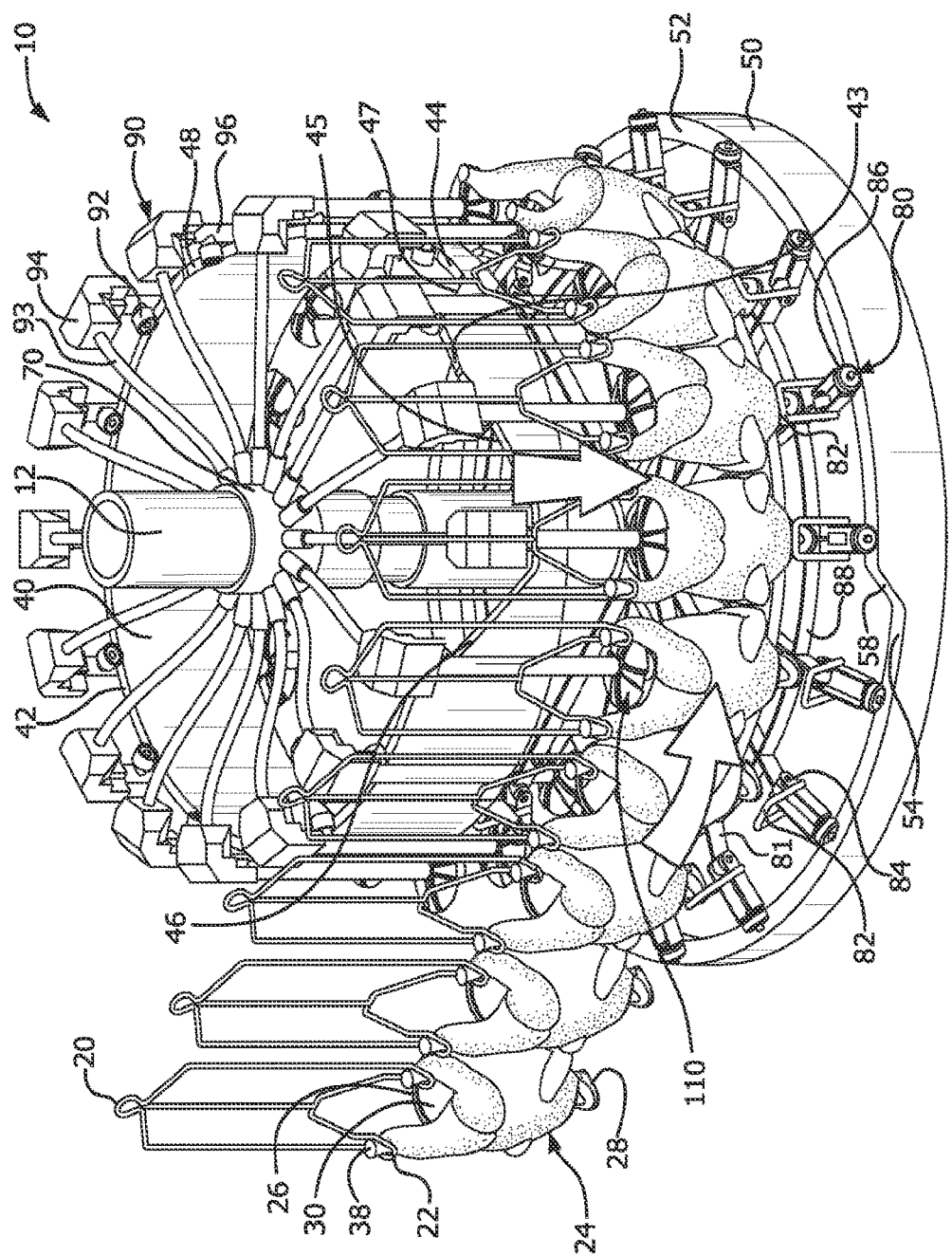
FIG. 3 is a perspective view of the embodiment of a poultry chilling system as in FIG. 1, showing poultry carcasses entering a carousel, being clamped, and having a cryogen injection assembly inserted.
Figure 4:
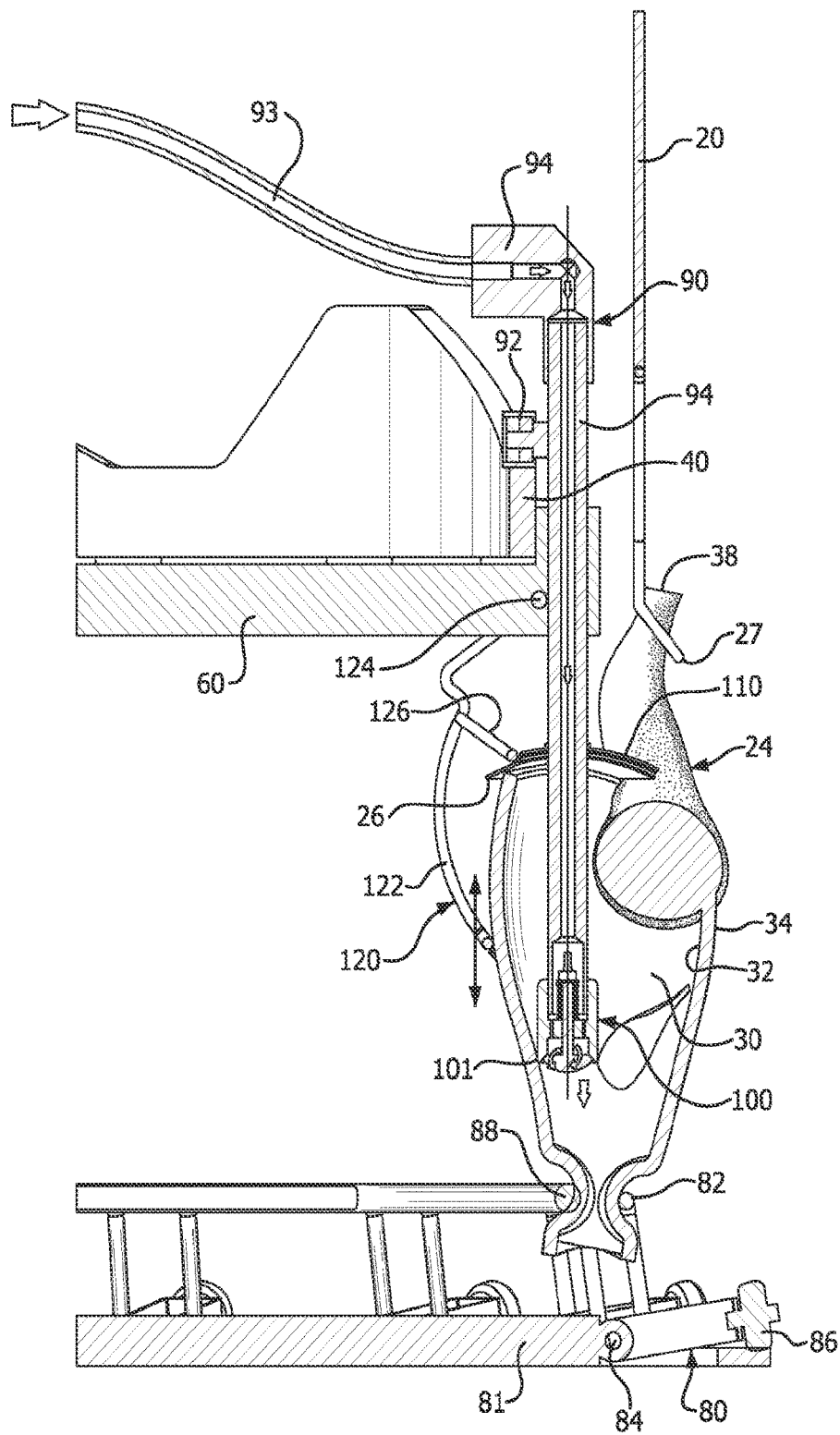
FIG. 4 is a side cross-sectional view of a poultry carcass during the step of spraying cryogen into the bird cavity in the embodiment of a poultry chilling system as in FIG. 1 while the carcass is being held on the carousel.
Figure 5:
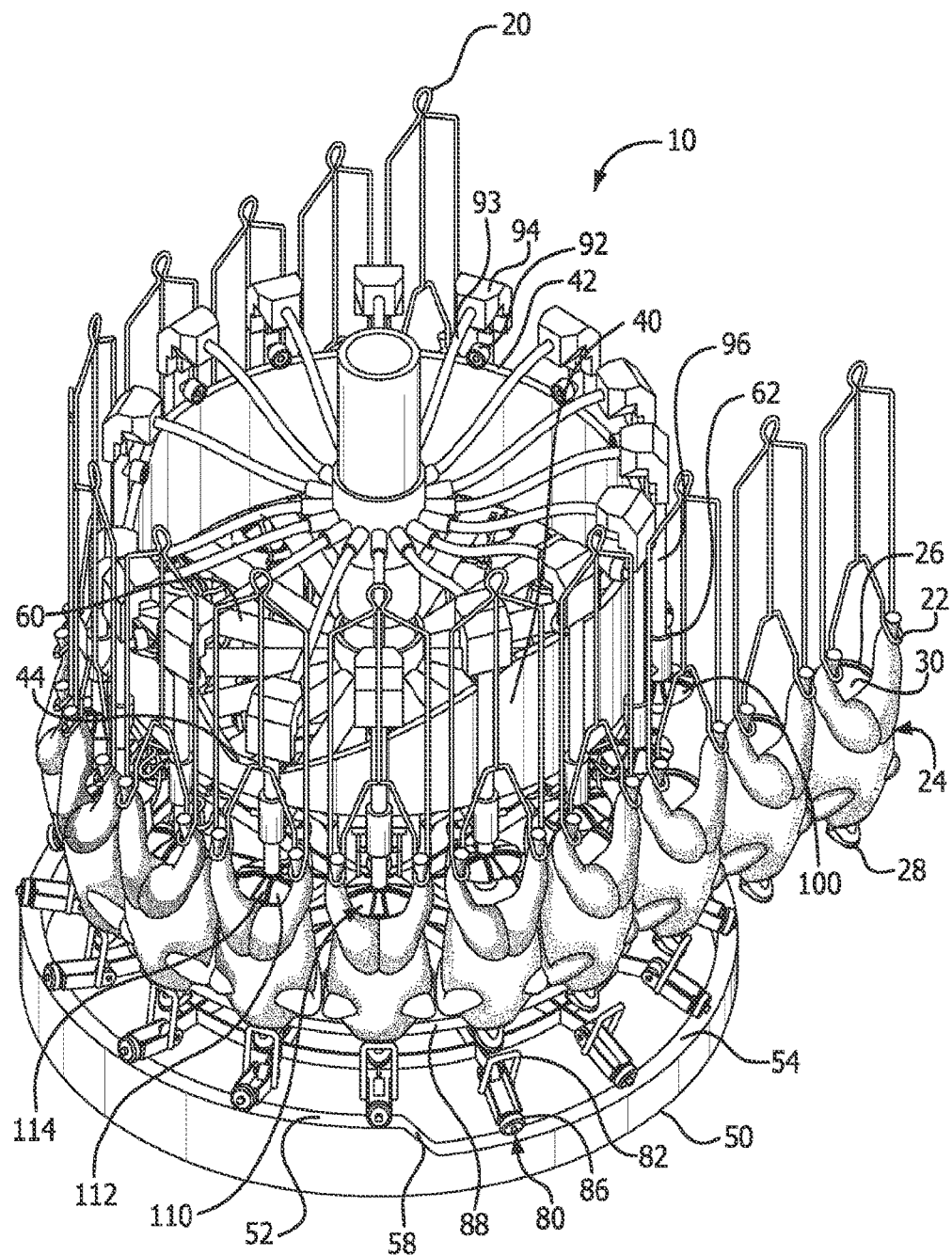
FIG. 5 is a perspective view of the embodiment of a poultry chilling system as in FIG. 1, showing poultry carcasses having the cryogen injection assembly removed, being unclamped, and exiting the carousel.

Described herein is an inline system and method for cryogenically chilling poultry carcasses with a cryogen, such as liquid nitrogen (LIN) and/or cold cryogen vapor gas or another cryogen, by either a custom-built machine or by integration into an existing poultry final inspection machine. A benefit of an inline system is that it provides minimum disruption to the existing processing line and does not require additional space in facilities that typically already are tight on processing space. By providing chilling from within the carcass, the cooling effect from the cryogenic coolant can be maximized to ensure for good efficiency. The cooling can also be achieved more homogeneously rather than by spot cooling as is typically provided in conventional chilling systems. Internal chilling will also prevent any freezing or damage to the outer surface of the poultry which may be seen as a problem by the industry. Further, bacterial reduction may be achieved, in particular campylobacter reduction, by more rapid cooling from the internal cavity of the carcass including the neck flap area.

Cryogen is introduced to the machine from a storage vessel located outside and piped to the machine using cryogenic piping. Current calculations indicate that at least about 0.2 liters of LIN, and preferably about 0.25 liters of LIN is required to achieve sufficient cooling into the poultry carcass, estimated to be about 35 kJ±5 kJ for an average size bird. The time available for LIN injection is at least about 2 seconds, preferably at least about 3 seconds, and possibly as long as 4 seconds or more, depending on the size of the machine and the speed at which birds are being processes. A poultry chilling system as described herein is capable of processing up to about 10,000 birds per hour. This allows a cryogen injection time of from about 2 seconds to about 4 seconds per carcass, and preferably about 3 seconds, depending on exact line speed and machine configuration. Typically, bird carcasses enter the machine at a rate of approximately 8,000 per hour straight after the evisceration and cleaning steps and when the bird temperature is at its hottest (>30° C.).

In the following description, the terms LIN (liquid nitrogen) and cryogen are used interchangeably to mean a cryogenic fluid, liquid, or cryogen vapor/gas that is injected into the bird carcass cavity.

In one embodiment of the machine, as illustrated in FIGS. 1-6, cryogen connects through a rotational coupling that allows supply of cryogen to individual stations on a carousel in the machine while the carousel is rotating (i.e., operating). The cryogen is then piped into an individual injection assembly at each station that is interlocked to ensure the presence of a bird at the station prior to allowing cryogen to flow. As the machine rotates the cryogen injection assembly is inserted into the bird carcass and the cryogen is dosed into the bird for a pre-set time. Once injection is complete the injection assembly is removed allowing the bird to continue along the process.

As the birds enter the rotation machine (running at about 8 rpm), they are detected as present before the LIN injector is allowed to enter the bird cavity and LIN is allowed to flow. At the same time the neck of the bird is clamped to at least partially prevent any LIN falling directly out of the bird. As the LIN injector is being actuated into the bird cavity, the LIN comes on automatically and is injected via a spray head including spring loaded valve. LIN is piped into the machine via a rotational coupling and piped to the individual LIN injectors through the machine internals. The LIN injector is fitted with a shield that rests on the bird cavity entrance. This shield not only prevents the LIN spraying directly out of the bird cavity, but also ensures the LIN has some time to be effective. The shield is further designed to allow cryogen vapor (gaseous nitrogen or GAN) exhausted from the cavity to be directed over the outside of the bird to provide further cooling as it vents and falls under gravity. Once LIN injection is complete the LIN injector is removed carefully so as not to damage the bird. The excess GAN is exhausted by ductwork and a negative pressure exhaust system.

Figure 6:
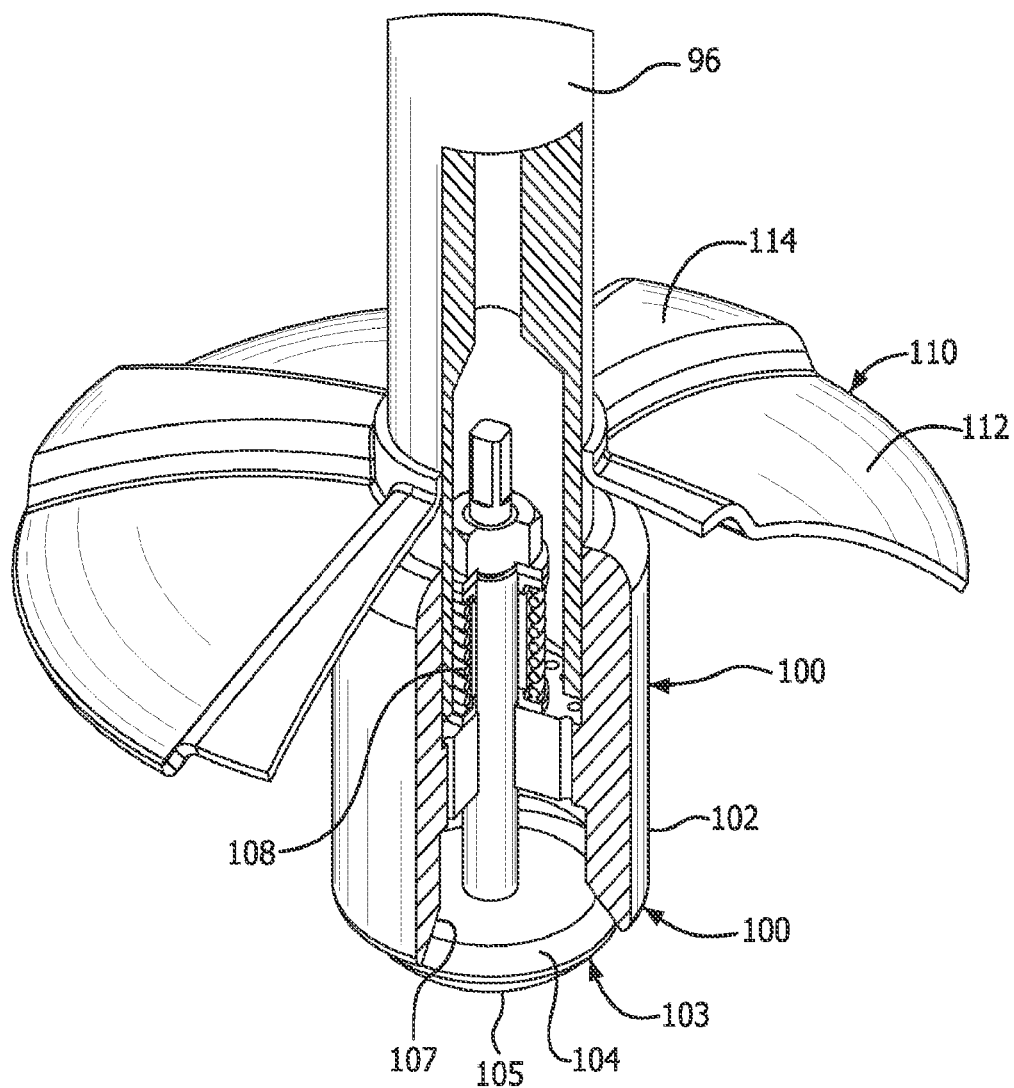
FIG. 6 is a side perspective cutaway view of a cryogen injection assembly including a spray head for use in the embodiment of a poultry chilling system as in FIG. 1.
Figure 7:
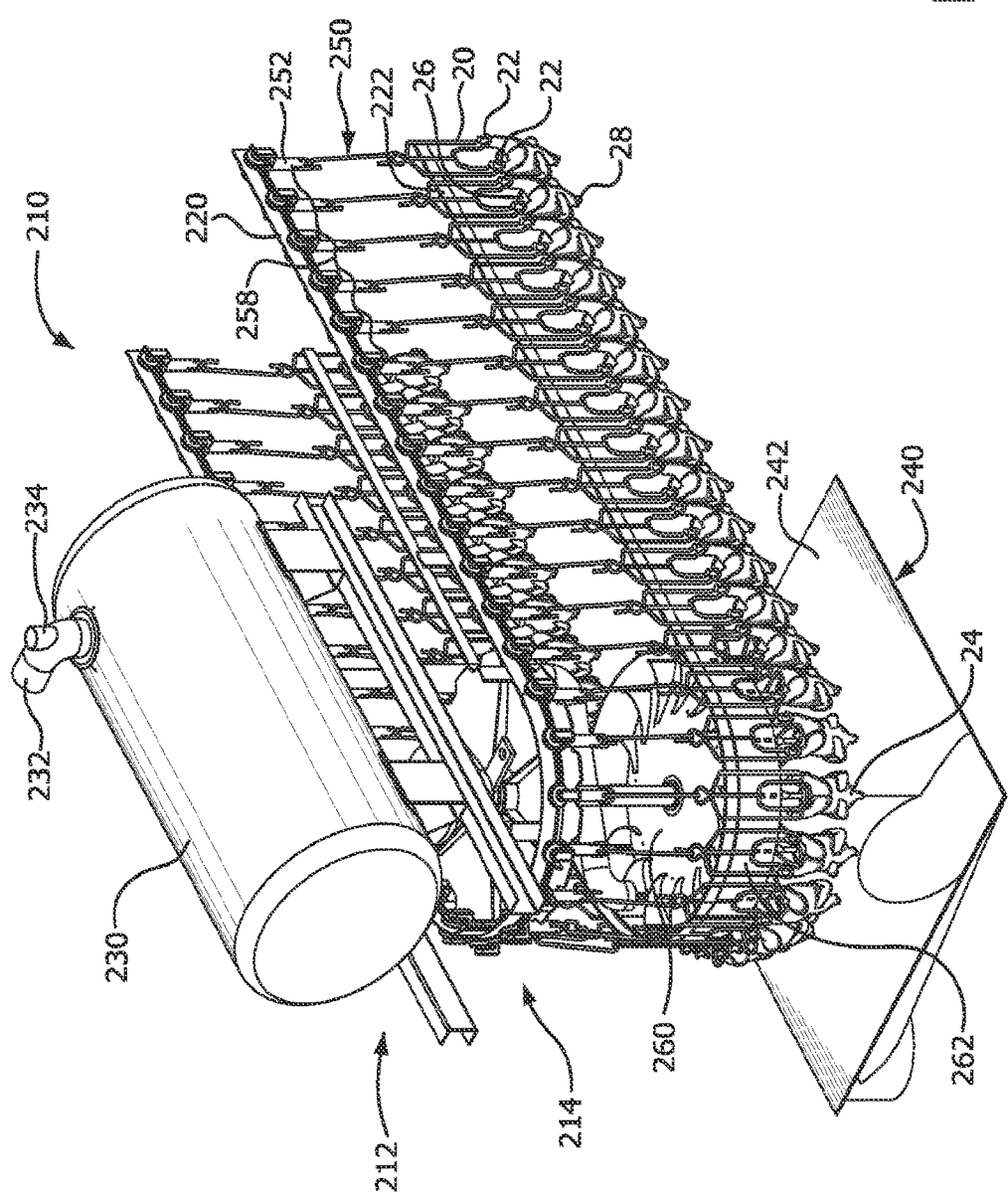
FIG. 7 is a perspective view of another embodiment of a poultry chilling system.
Figure 8:
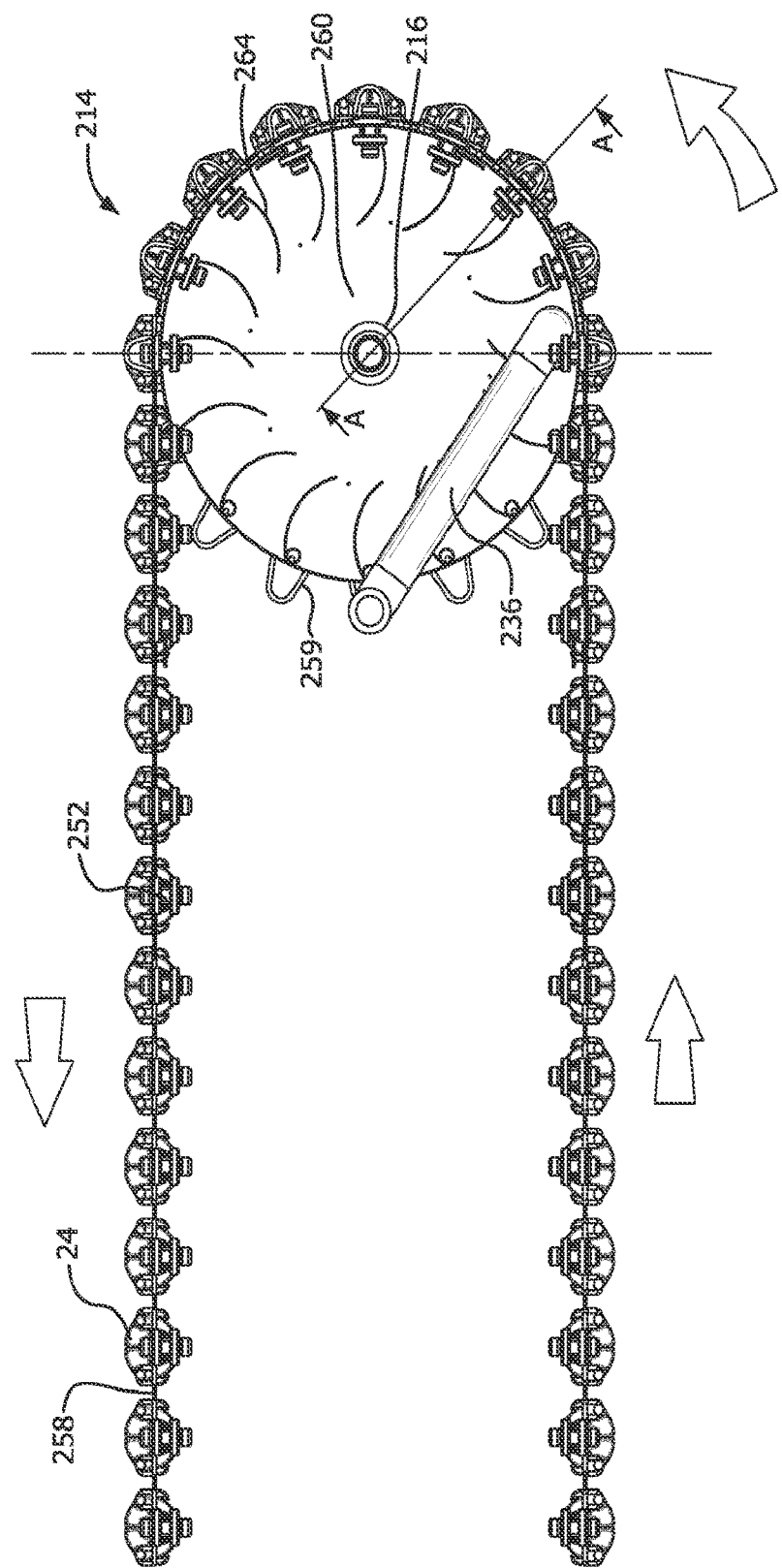
FIG. 8 is a top view of the embodiment of a poultry chilling system as in FIG. 7, showing the movement of poultry carcasses through the system.
Figure 9:
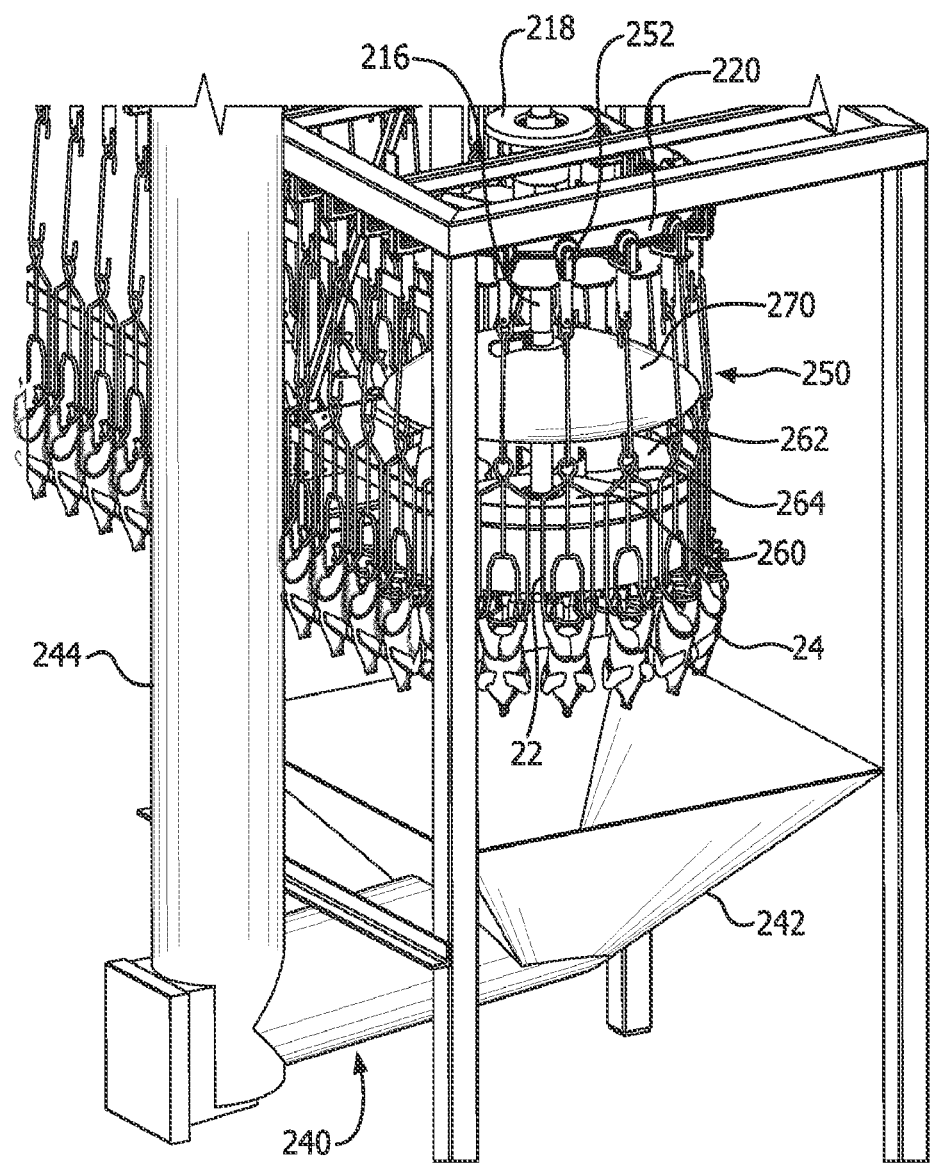
FIG. 9 is an expanded perspective view of the embodiment of a poultry chilling system as in FIG. 7.

Referring to the drawings, there is shown in FIGS. 1-6, and particularly in FIGS. 1 and 6, an embodiment of an inline cryogenic poultry chilling system 10. The system 10 includes a stator 12 having a hub 18, and a carousel 14 having a hub 15 that is rotatable about the stator hub 18. A substantially circular top cam rail 40 is fixed to the stator 10, and includes an upper top surface 42, a lower top surface 44, a downward sloping transition surface 46 joining the upper top surface 42 to the lower top surface 44, an upward sloping transition surface 48 joining the lower top surface 44 to the upper top surface 42. The top cam rail 40 optionally also has an intermediate top surface 43, an upward sloping transition surface 47 joining the lower top surface 44 to the intermediate top surface 43, and a downward sloping transition surface 45 joining the intermediate top surface 43 to another lower top surface 44. A substantially circular bottom cam rail 50 is also fixed to the stator 10, and includes an upper top surface 52, a lower top surface 54, a downward sloping transition surface 56 joining the upper top surface 52 to the lower top surface 54, and an upward sloping transition surface 58 joining the lower top surface 54 to the upper top surface 52. The top cam rail 40 and the bottom cam rail 50 are substantially aligned so that the upper top surface 42 of the top cam rail 40 spans approximately the same angle range around the stator 12 as the lower top surface 54 of the bottom cam rail 50, and the lower top surface 44 of the top cam rail 40 spans approximately the same angle range around the stator 12 as the upper top surface 52 of the bottom cam rail 50. As described below, the relative orientation of the top and bottom cam rails 40, 50 coordinates movement of a cryogen injection apparatus 90 and a neck clamping apparatus 80.

The carousel 14 includes a plurality of stations 16. For example, the depicted embodiment has sixteen stations 16 equally spaced about the carousel 14, it being understood that other embodiments could have other numbers of stations depending on the diameter of the carousel 14 and the spacing of the birds 24. Each station 16 is configured to cooperate with the top cam rail 40, the bottom cam rail 50, and a poultry hanger 20 that is one of a series of hangers 20 in an inline poultry processing system.

The stator 12 includes a cryogen supply pipe (not shown) and a rotating joint 70 to enable distribution of cryogen to each of the stations 16.

Each station 16 includes a support arm 60 extending radially outward from the carousel hub 15 to support a mounting sleeve 62 that rotates with the carousel 14. Each station 16 further includes a cryogen injection assembly 90 having a flexible cryogen feed pipe 93, a spray pipe 96, a fitting 94 enabling cryogen flow from the flexible cryogen feed pipe 93 to the spray pipe 96, a cam follower 92 affixed to the spray pipe 96, and a spray head 100 affixed to a bottom end of the spray pipe 96. The cryogen feed pipe 93 is connected to the rotating joint 70 to receive cryogen supplied by the stator cryogen supply pipe (not shown). A metering valve (not shown) may be provided in the cryogen feed pipe 93 to enable adjustment of cryogen flow to each station 16.

The spray head 100 includes a valve 101 for distributing cryogenic liquid into a poultry carcass cavity 30. In the depicted embodiment the valve 101 is a poppet valve having a valve body 102 and valve mechanism 103 mounted inside the body 102. The valve body 102 is connected at an upper end to the spray pipe 96 and has an opening 107 at a lower end. The valve mechanism 103 includes valve head 104 supported by a valve stem 106, and the valve head 104 has an outer face 105. The valve mechanism 103 is biased to a closed position by a spring 108 positioned between the valve stem 106 and the valve body 102 such that a sufficient "cracking pressure" of cryogen inside the spray pipe 96 is required to open the valve mechanism 103 and permit flow of cryogen.

A shield 110 is mounted to the spray pipe 96 at a location above the spray head 100. The shield 110 includes corrugations in the form of a series of adjoined alternating lower plates 112 and upper plates 114 to provide paths for cold cryogen vapor/gas flow to exit a poultry carcass when the cryogen injection assembly 90 is in use. Specifically, the lower plates 112 provide for substantial sealing between the shield 110 and a bird surface on which the shield 110 rests, while the upper plates 114 allow for a gap between the shield 110 and the surface to allow cold cryogen vapor/gas flow therethrough.

The cryogen injection assembly 90 is positioned to be slidably movable in the upward and downward direction within the mounting sleeve 62. The cryogen injection assembly 90 is slidable between an upper or retracted position and a fully lowered or inserted position.

An interlock mechanism 120 is mounted to the carousel hub 15 and includes an interlock member 122 hingedly supported by a hinge pin 124 in the support arm 60, and an injector support member 126 extending radially outwardly from the interlock member 122. The interlock member 122 is biased to a first position by gravity and/or a spring (not shown), and can be pivoted to and held in a second position, for example by a poultry carcass positioned in the station 16. When the interlock member 122 is in the first position, the injector support member 126 is positioned directly beneath and in contact with the outer face 105 of the valve head 104 of the poppet valve 101, so as to support the weight of the cryogen injection assembly 90 in the retracted position when a poultry carcass is absent from the station 16. Therefore, when the interlock member 122 is in the first position, i.e., when a poultry carcass is not present in the station, the valve mechanism 103 is maintained in a closed position, even if cryogen pressure above the cracking pressure is present in the spray pipe 96, so as to prevent cryogen flow in the absence of a poultry carcass. When a poultry carcass is present in the station, the carcass contacts the interlock member 122 and pivots the interlock member 122 to the second position, such that injector support member 126 is removed from beneath the poppet valve 100, thereby allowing downward movement of the cryogen injection assembly 90 away from the retracted position and toward the fully inserted position when a poultry carcass is present in the station 16, and thereby allowing the valve mechanism 103 to open and deliver cryogen when cryogen having a pressure exceeding the cracking pressure is present in the spray pipe 96.

The cam follower 92 of the cryogen injection assembly 90 is configured to ride on the top cam rail 40. When the cam follower 92 is riding on the upper top surface 42 of the top cam rail 40, the cryogen injection assembly 90 is in the retracted position, and when the cam follower 92 is riding on the lower top surface 44 of the top cam rail 40, the cryogen injection assembly 90 is in the fully inserted position. The downward sloping surface 46 and the upward sloping surface 48 provide for smooth transitions from the cryogen injection assembly 90 between the retracted and inserted positions. Optionally, the top cam rail 40 may also include the intermediate top surface 43 and its corresponding upward and downward sloping surfaces 45 and 47, to enable the cryogen injection assembly 90 to be oscillated up and down between partially and fully inserted positions to better distribute spray of cryogen within the carcass cavity.

Each station 16 further includes a neck clamp assembly 80 extending radially outward from the carousel hub 15 so as to rotate with the carousel 14. The neck clamp assembly 80 includes a base 81, a neck clamp 82 pivotably mounted to the base 81 at a hinge 84, and a clamp ring 88 rigidly mounted to the base 81. The neck clamp 82 is positioned radially outward from the clamp ring 88, so that when a poultry carcass is present in the station 16, the clamp ring 88 is on one side of the carcass neck and the neck clamp 82 is on an opposite side of the carcass neck.

A cam follower 86 is mounted to the neck clamp 82 in a position capable of causing the neck clamp 82 to pivot about the hinge 84 between a clamping position and a release position. The cam follower 86 is configured to ride on the bottom cam rail 50. When the cam follower 86 is riding on the upper top surface 52 of the bottom cam rail 50, the neck clamp 82 is in the clamping position, and when the cam follower is riding on the lower top surface 54 of the bottom cam rail 50, the neck clamp 82 is in the release position.

The chilling of poultry carcasses can best be seen with reference to FIGS. 2-5. In operation, poultry carcasses 24 are provided to the system 10 on a series of hangers 20, each hanger having leg clamps or loops 22 to suspend a carcass 24 by the legs 38 with a cavity opening 26 oriented generally upward and a neck opening 28 oriented generally downward. The cavity opening 26 and the neck opening 28 are joined by an internal cavity 30 of the carcass 24, from which the organs have been removed. The cavity 30 is bounded by an inner wall 34, and the carcass 24 has an outer wall 34 external to the cavity 30.

During operation, the carousel 15 continually rotates about the stator 12. The series of hangers 20, moving at the same speed as each of the stations 16 on the carousel 15, delivers a carcass 24 in alignment with each station 16.

Just before a carcass is delivered to the station 16, the cryogen injection assembly 90 is in the retracted position, the cam follower 92 is riding on the upper top surface 42 of the top cam ring 40, and the interlock assembly 120 is positioned to prevent movement of the cryogen injection assembly 90 to the inserted position and to prevent flow of cryogen through the spray head valve 101. At the same time, the cam follower 86 is riding on the lower top surface 54 of the bottom cam rail 50, so that the neck clamp 82 is in the release position.

When a carcass is delivered to the station 16, the cryogen injection assembly 90 is still in the retracted position with the cam follower 92 riding on the upper top surface 42, while the interlock member 122 and the injector support member 126 have been flexed out of the way by the presence of the carcass to enable movement of the cryogen injection assembly 90 and the opening of the valve 101. As the carousel 15 continues to rotate, the cam follower 92 rides down the downward sloping transition surface 46 to the lower top surface 44 of the top cam rail 40, and the cryogen injection system 90 is correspondingly lowered by gravity to the inserted position, with the spray pipe 96 extending through the cavity opening 26 of the carcass 24 and the spray head 100 being positioned within the cavity 30.

The cam follower 92 may remain on the lower top surface 44, or the cam follower 92 may ride up to the intermediate top surface 43 and back down to the lower top surface 44, so that cryogen injection system 90 is either in the fully inserted position or oscillates between the fully inserted position and a partially inserted position, all the while delivering cryogen into the from the spray head 100 into the cavity 30. Cryogen continues to flow as the carousel 14 rotates and the cam follower 92 remains riding on the lower top cam surface 44 or oscillates between the lower and intermediate top cam surfaces 43 and 44. When the cryogen injection system 90 is in the inserted position, the shield 110 is positioned so that the lower plates 112 of the shield 110 are resting approximately on top of the cavity opening 26 so as to prevent liquid cryogen from being sprayed out the cavity opening 26. However, the seal of the shield 110 on the cavity opening 26 is intentionally imperfect due to the presence of the upper plates 114 in the shield 110, so that gaseous cryogen vapor (once the liquid cryogen has taken on enough heat to vaporize) can flow out the cavity opening 26 through gaps between the carcass 24 and the upper plates 114, and due to its coolness and density, flow down along the outer wall 34 of the carcass 24.

A vacuum assembly 130 is preferably provided to draw away gaseous cryogen once it has exited the cavity 30, so as to prevent asphyxiation hazards in the area of the system 10.

Substantially simultaneously with the insertion of the cryogen injection assembly 90 into the cavity 90, the cam follower 86 rides up the upward sloping transition surface 58 to the upper top surface 52 of the bottom cam rail 50, causing the neck clamp 82 to move to the clamping position to at least partially close off the neck opening 28 of the carcass 24, in order to prevent or inhibit liquid cryogen from being sprayed or leaking directly out of the neck opening 26 from the cavity 30. The neck opening 26 remains clamped as the carousel 14 rotates and the cam follower remains riding on the upper top cam surface 52.

Next, as the carousel 14 continues to rotate, the cam follower 92 encounters the upward sloping transition surface 48 and the cam follower 86 encounters the downward sloping transition surface 56. The lifting of the cam follower 92 toward the upper top surface 42 causes retraction of the cryogen injection assembly 90. Substantially simultaneously, the lowering of the cam follower 86 toward the lower top surface 54 causes release of the neck clamp 82 so that any remaining liquid cryogen or cryogen vapor in the cavity 30 can drain, and the carcass 24 can be removed from the station 16. Cryogen flow stops when the cryogen injection assembly 90 reaches the retracted position and the interlock mechanism 120 returns to its first position upon removal of the carcass 24, so that the injector support member 126 is positioned beneath and supports the valve 101.

Once the cryogen injection assembly 90 is in the retracted position (the cam follower 92 is riding on the upper top surface 42) and the neck clamping assembly 80 is released (the cam follower 86 is riding on the lower top surface 54), the hanger 20 removes the carcass 24 from the station 16 and the carousel 15 rotates around for the station 16 to receive another carcass 24 that needs to be chilled. Once the carcass 24 has been removed, the interlock 120 returns to its first position such that the spray head valve 101 is held in a closed position until another carcass arrives at the station 16.

In another embodiment of the machine, as illustrated in FIGS. 7-14, cryogen from the external storage vessel is flowed into a degassing tank that separates cryogen gas from liquid, and cryogen consisting substantially of liquid is provided to the machine for chilling carcasses. The liquid cryogen is then piped into a convex tundish positioned above the a plurality of stations in the carousel, the tundish being configured to cause the cryogen to flow through a series of ports located near an outer edge of the tundish and into a bird at each station. Cryogen is introduced into the tundish at about the location where birds are being loaded into the stations. As the machine rotates the cryogen flows by gravity through an injector at each station into the bird carcass. The cryogen dose is set by the flow rate of cryogen into the tundish and the rotational speed of the carousel. The dose is calibrated so that injection by gravity is complete by the time the bird has rotated partway around the carousel and is removed from the station, allowing the chilled bird to continue along the process.

As the birds enter the rotation machine (running at about 8 rpm), each bird is aligned in a station such that an injector is positioned directly above the cavity opening of the bird and the neck opening is facing downward. In some cases, the neck of the bird is clamped or held at least partially closed to inhibit any LIN falling directly out of the bird. As LIN is being fed by gravity into the bird cavity, some of the LIN may drop through the neck and much of the LIN will vaporize to GAN as it contacts and cools the bird. Some GAN may flow upward out of the bird and then down along the outside of the carcass (since cold GAN is denser than the surrounding air), thereby providing further cooling. The GAN escaping from the birds is collected by a collector beneath the carousel and exhausted by ductwork and a negative pressure exhaust system.

Referring to the drawings, there is shown in FIGS. 7-14 another embodiment of an inline cryogenic poultry chilling system 210. The system includes a stationary portion 212 and a carousel 214 configured to rotate with respect to the stationary portion 212. The carousel 214 includes a plurality of stations 211 spaced around the carousel 214 at substantially equal angles from each other, for receiving bird carcasses that are approximately equally spaced apart in a processing line. For example, the depicted embodiment includes sixteen stations 211 spaced at approximately 22.5° intervals, it being understood that the number of stations may vary depending on several factors, including without limitation the diameter of the carousel 214 and the spacing of carcasses in the processing line.

The carousel 214 is supported by the stationary portion 212 via a drive shaft 216 which forms an axis for rotation of the carousel 214. The drive shaft 216 is propelled through a drive coupling 218 that is connected to a source of rotational movement, which may include, without limitation, one or more of a drive belt, a drive chain, a gearbox, and a motor.

Figure 10:
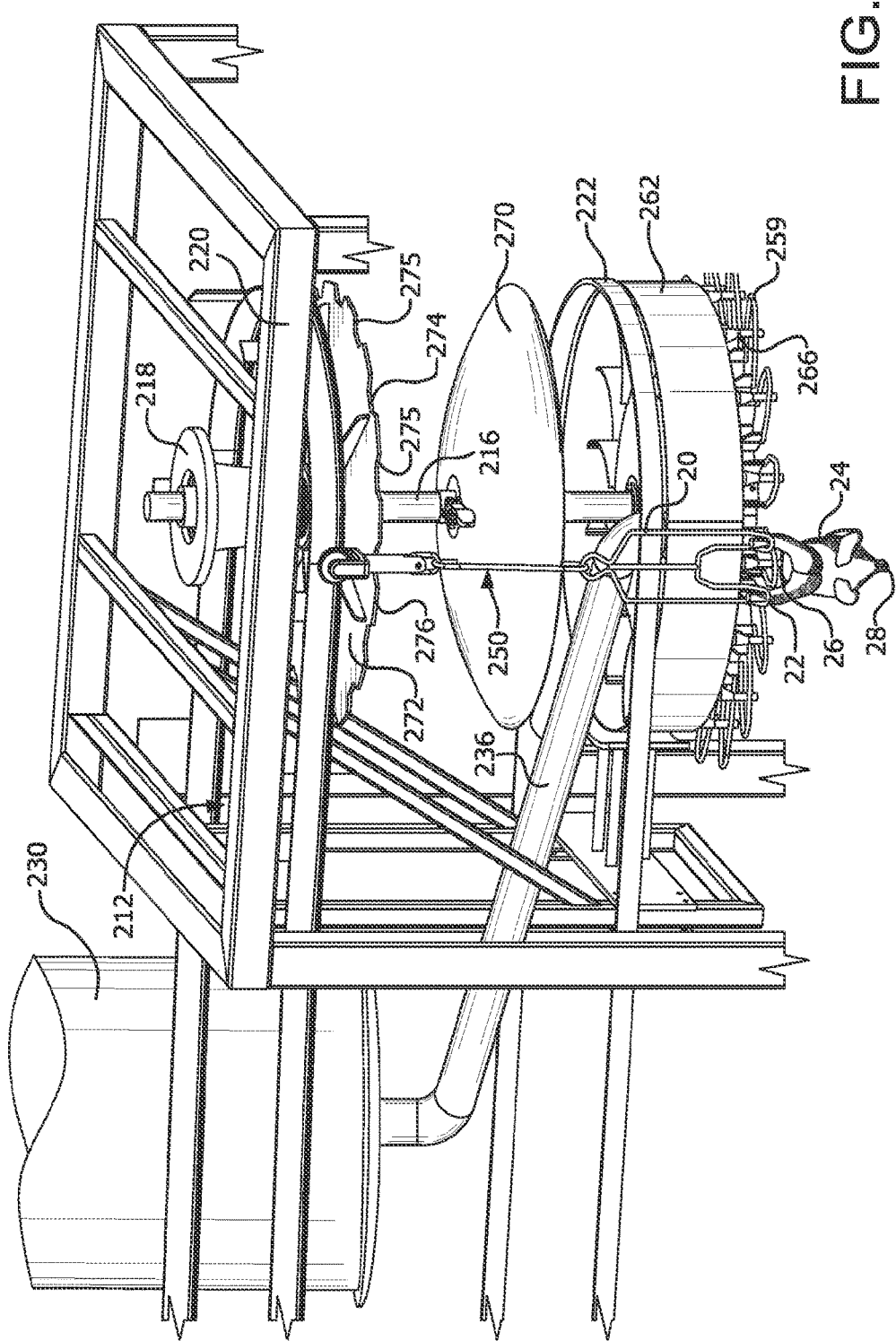
FIG. 10 is a side view of an embodiment of a poultry chilling system as in FIG. 7, showing one poultry carcass entering the system.
Figure 11:
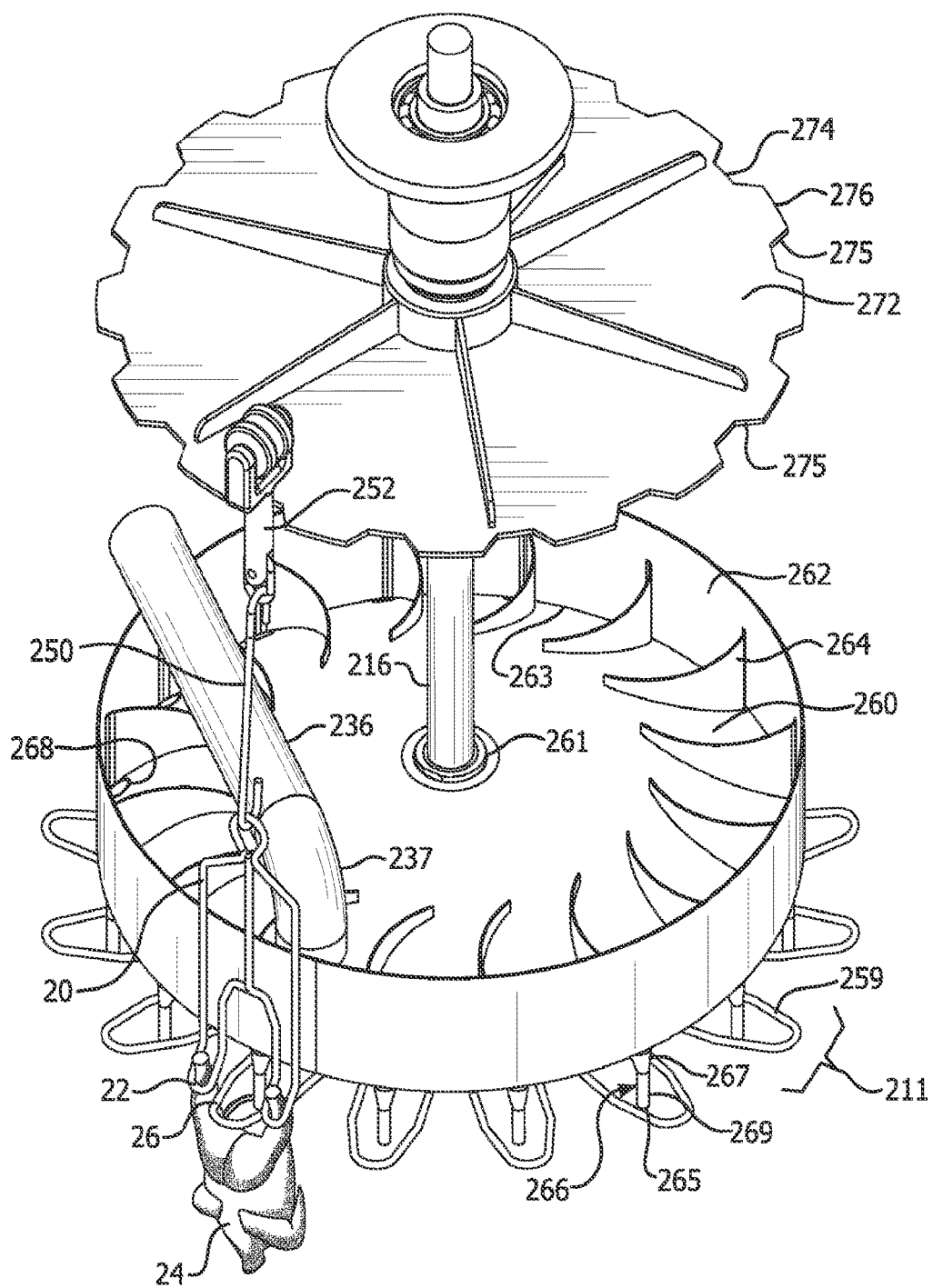
FIG. 11 is a top perspective view of the embodiment of a poultry chilling system as in FIG. 10.
Figure 12:
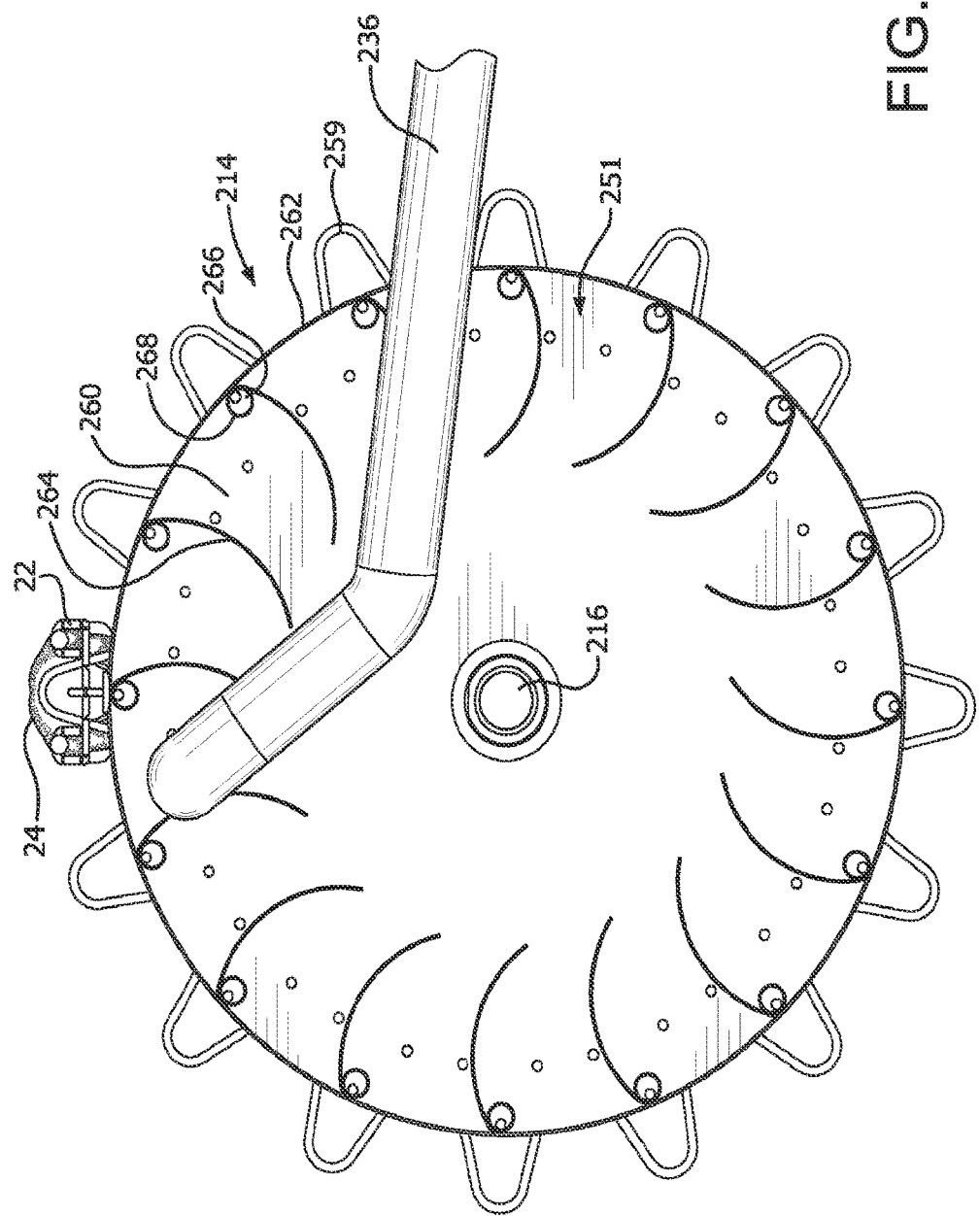
FIG. 12 is a top view of the embodiment of a poultry chilling system as in FIG. 10.
Figure 13:
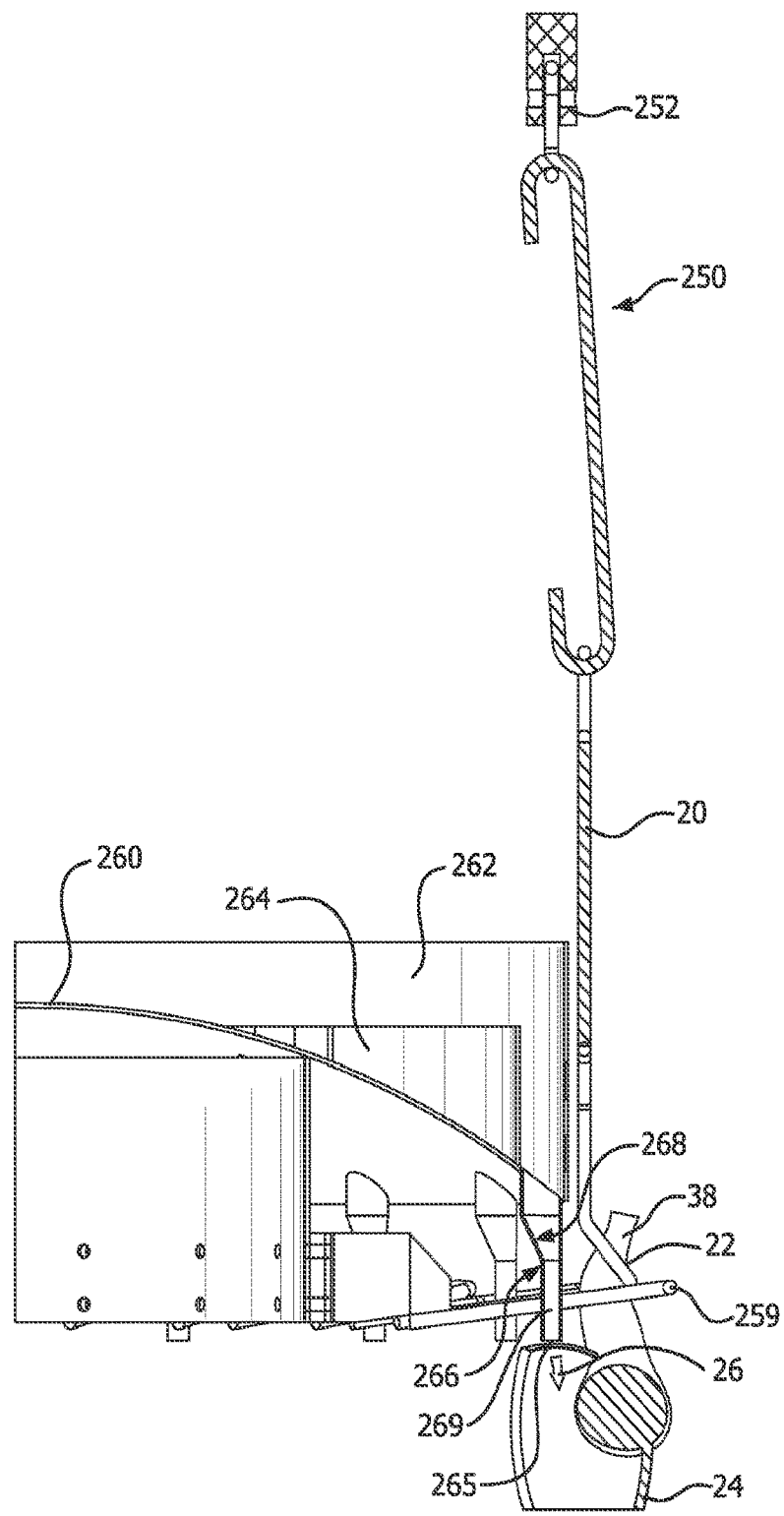
FIG. 13 is a cross-sectional view of a poultry carcass in the embodiment of a poultry chilling system as in FIG. 10.
Figure 14:
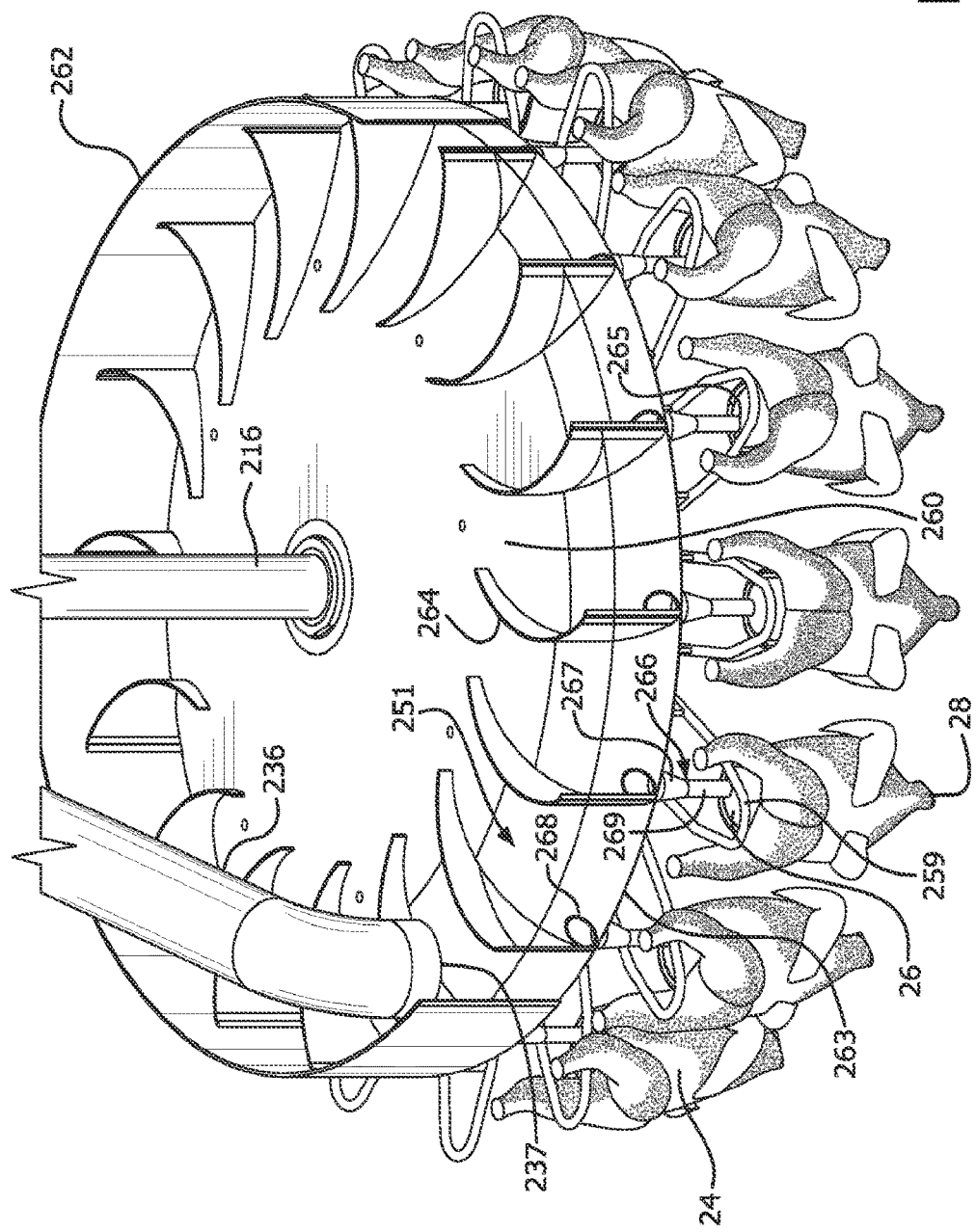
FIG. 14 is a partially cut away top perspective view of the embodiment of a poultry chilling system as in FIG. 7, showing poultry carcasses being chilled.

As shown in FIGS. 7-14, and particularly in FIGS. 10 and 11, the carousel 214 includes a substantially circular tundish 260 suspended at its center 261 from the drive shaft 216. The tundish 260 includes an outer or perimeter edge 263 and a raised rim 262 extends upwardly from the perimeter edge 263 of the tundish 260. In the depicted embodiment in FIGS. 13 and 14, the tundish 260 has a generally convex upward shape, with the center 261 being the high point and the tundish 260 sloping downward toward the perimeter edge 263. A convex shape causes the steepness of the slope to increase toward the perimeter edge 263. Alternatively, the tundish 260 may be formed in other shapes that slope generally downward toward the perimeter edge 263, including as non-limiting examples a conical shape, a truncated conical shape, and generally flat shape with an annular trough adjacent to and including the perimeter edge 263.

A plurality of outlet ports 268 are positioned in the tundish 260 near or adjacent to the perimeter edge 263, each outlet port 268 corresponding to a station 211. Accordingly, the outlet ports 268 are spaced apart at substantially equal circumferential distances along the perimeter edge 263. An injector 266 extends downwardly from each outlet port 268. The injector 266 is configured to deliver liquid cryogen flowing by gravity from the tundish 260 through the outlet port 268 into a cavity opening 26 of a bird carcass 24. The injector 266 has a bottom end 265 that is configured to be positioned at or slightly above the cavity opening 26 of a carcass 24 when the carcass 24 is in the station 211. In the depicted embodiment, the injector 266 includes an upper funnel portion 267 connected to a lower cylindrical portion 269, it being understood that the injector 266 may include one or more of a limitless number of geometric shapes that are similarly capable of delivering liquid cryogen from the outlet port 268 into the bird cavity opening 26.

A plurality of baffles 264 are positioned on the tundish 260, a baffle 264 corresponding to each station 211 and aligned to direct cryogen flow into a corresponding outlet port 268 during rotation of the carousel 214. In the depicted embodiment, with particular reference to FIG. 14, the direction of rotation of the carousel 214 is counter-clockwise. The baffle 264 is positioned adjacent to the trailing edge of its corresponding outlet port 268. The baffle 264 may be of various shapes, and extends radially inward on the tundish 260 by a distance that is necessary to capture a dose of cryogen supplied to each station 211. It has been determined by experimentation that a curved baffle 264, as shown, works well at forming essentially a reservoir 251 for each station 211 to hold a quantity of liquid cryogen that is delivered into the tundish 260 for each station 211 so that the liquid cryogen may be dispensed into a bird 24 positioned at the station 211 as the carousel 214 rotates.

The combination of the outlet port 268 and the injector 266, as well as the shape of the tundish 260 and the shape and extent of the baffle 264, can be used to control the rate at which liquid cryogen flows or is dispensed from the tundish 260 into the bird 24. The flow of cryogen should be controlled so that the reservoir 251 completely empties or nearly completely empties into a bird 24 during the time it is positioned in a station 211. In other words, cryogen flow should be sufficiently rapid that all of the cryogen delivered to the reservoir 251 gravity feeds into the bird 24 during rotation of the carousel 214 between the time a bird 24 is positioned in a station 211 and the time the bird 24 is removed from the station 211. However, cryogen flow should not be so rapid as to deliver cryogen into the bird 24 quicker than it can be productively used for cooling, i.e., quicker than it can evaporate within the bird cavity.

Significant liquid cryogen falling out of the neck opening 255 of the bird 24 may result in inefficient use of cryogen, although a small or even a substantially amount of liquid cryogen falling out of the neck opening 255 may be tolerated for the beneficial purpose of killing bacteria in the neck opening 255. In particular, the systems and methods described herein may be used to deliver cryogen into the bird 24 at an amount and rate so that the neck opening 255 and neck flaps surrounding the neck opening are chilled sufficiently so as to dramatically reduce or substantially eliminate campylobacter bacteria in that region of the bird, which is usually the most difficult to disinfect.

Further, alone or in combination with control of the cryogen flow rate, a mechanism may be employed to at least partially clamp the neck opening 255 of the bird 24 to prevent or reduce loss of liquid nitrogen therethrough, for example a neck clamping apparatus 80 as describe above, or another functionally equivalent structure.

Substantially liquid cryogen is delivered to the tundish 260 from a degassing tank 230 located on the stationary portion 212 of the system 210. The degassing tank 230 is mounted above the carousel 14 to enable gravity feeding of liquid from the tank 230 into the tundish 260. Cryogen is supplied to the degassing tank 230 from an external storage tank or liquid cryogen production plant (not shown) through an inlet conduit 232. Although the external storage tank or plant is configured to delivery primarily liquid cryogen, heat leak in the piping will inevitably cause some vaporization of the liquid prior to reaching the system 210. Without a degassing tank 230, the resultant mixture of liquid and gaseous cryogen would be more difficult to deliver by a gravity feed system and would have reduced cooling capacity as compared with liquid alone (due to the lost cooling capacity in the form of the latent heat of vaporization of the liquid that had already changed phase to gas).

Therefore, it is preferred to use the degassing tank 230 for temporary storage of cryogen before delivery into the tundish 260. The degassing tank 230 separates liquid cryogen from gaseous cryogen, allowing the gaseous cryogen to be vented by a vent conduit 234, and delivers substantially liquid cryogen to the tundish 260 via a feed conduit 236. The feed conduit 236 slopes continuously downward from the degassing tank 230 toward the tundish 260, and terminates at an end 237 positioned above the tundish 260 and the baffles 264 so as not to interfere with rotation of the carousel 214. Liquid cryogen flows continuously from the degassing tank 230 when the system 210 is operating, so that as the carousel 214 rotates, a dose of liquid cryogen drops from the feed conduit 236 into the reservoir 263 corresponding to each station 211, at a point just after a bird 24 has been loaded into the station 211. By the time the bird 24 is removed from the station 211, the dose of liquid cryogen will have substantially emptied from the reservoir 236 into the bird 24, as described above.

One or more mechanisms, alone or in combination, may be used to align each bird 24 with a station 211, so that the injector 266 is positioned to gravity feed liquid cryogen into the cavity opening 26. In a poultry processing plant, each bird 24 is suspended by the legs from a hanging support 250 that includes a trolley 252 at its upper end and hanger 20 with a a pair of leg loops 22 at its lower end. The trolley 252 has wheels and is configured to ride on, and be guided by, a rail. For example, the system 210 includes a top rail 220 for supporting the hanging supports 250 via the trolleys 252. The spacing of the trolleys 252, and hence the birds 24, is controlled by a chain 258 that links each trolley 252 to the two adjacent trolleys 252, in a long train of trolleys 252 that ties the carcasses 24 together in a long processing line.

A trolley guide 272 is mounted to the drive shaft 26 above the carousel and just below the top rail 220, at a height corresponding to the location of the trolleys 252. The trolley guide 272 has around its generally circular perimeter a series of alternating notches 274 and teeth 276, with each notch 274 being spaced apart by the same distance as the trolleys 252 are spaced apart on the chain 258. Preferably, as shown in the depicted embodiment, the notches 274 include tapered sides 275 to facilitate receipt and release of trolleys 252 from the trolley guide 272. As each hanging support 250 comes into the system 210, its corresponding trolley 252 is received into a notch 274, and each successive hanging support 250 is received into the next notch 274, and so on. The notches 274 are aligned with the stations 211, so that retaining a trolley 252 in a notch 274 corresponds with a bird 24 being positioned in a station 211 with the injector 266 located directly above the cavity opening 26.

To further ensure alignment of the bird 24, primarily in the circumferential direction, the carousel 214 may include a plurality of leg guides 259, each leg guide 259 being located symmetrically with respect to the injector 266 in a corresponding station 211. In the depicted embodiment, the leg guide 259 includes a U-shaped or V-shaped member extending radially outward from the tundish 260 with its apex at a radially outermost end and a space to allow cryogen to pass from the injector 266 into the bird 24. The leg guide 259 is symmetric with respect to the injector 266 in each station. When a bird 24 is in place in a station 211, one leg of the bird 24 is positioned on either side of the leg guide 259, so that injector 266 is positioned over the cavity opening 26 of the bird 24.

To further ensure alignment of the bird 24 in the station, a bottom rail 222 may be provided running approximately parallel to the top rail 220. As a bird 24 moves through the system 10, the hanger 20 holding the bird 24 rests against and is guided by the bottom rail 222 to maintain the position of the bird 24 at the proper radial distance so that the injector 266 remains above the cavity opening 26.

An exhaust system 240 is provided to safely vent gaseous cryogen, for example GAN, that has vaporized after being used to cool the birds 24. The exhaust system 240 includes an inverted vent hood 242 positioned beneath the carousel 214 to capture cold gaseous cryogen that falls out of the birds 24 through the neck opening 28 or that spills out the top of the birds 24 through the cavity opening 26 and drifts downward due to its density. In addition, negative pressure in the vent hood 242, created by an exhaust fan (not shown) draws the gaseous cryogen from the carousel area into the exhaust system 240. Gaseous cryogen drawn into the vent hood 242 is further taken away in exhaust ducting 244, which is also under negative pressure from the exhaust fan. The speed of the exhaust fan, and thus the exhaust flow rate, can be controlled to correspond generally to the flow rate of liquid cryogen into the tundish 260, such that if liquid cryogen flow is increased the exhaust flow is also increased by a comparable amount, and vice-versa. Oxygen sensors (not shown) may also be employed in the vicinity of the system 210 to ensure that the exhaust system 240 is drawing away sufficient amounts of the gaseous cryogen to ensure that a safe work environment is always present.

Further, a bird counter (not shown) may be used to detect the passage of birds 24 into our out of the system 210, to count the number of birds processed and also as an interlock to ensure that liquid nitrogen is not flowed when no birds are being processed.

The present invention is not to be limited in scope by the specific aspects or embodiments disclosed in the examples which are intended as illustrations of a few aspects of the invention and any embodiments that are functionally equivalent are within the scope of this invention. Various modifications of the invention in addition to those shown and described herein will become apparent to those skilled in the art and are intended to fall within the scope of the appended claims.

The invention claimed is:

1. A cryogenic poultry chilling system comprising:
   a rotatable carousel including:
      a plurality of stations each configured and arranged to receive a corresponding poultry carcass suspended from leg hangers, the corresponding poultry carcass having an upward facing cavity opening and a downward facing neck opening;
      a tundish having a plurality of outlet ports with an outlet port corresponding to each of the plurality of stations; and
      a plurality of injectors with an injector extending downwardly from each of the tundish outlet ports configured and arranged to deliver liquid cryogen into the cavity opening of the carcass in the corresponding station; and
   a cryogen delivery apparatus configured and arranged to deliver substantially liquid cryogen into the tundish.

2. The cryogenic poultry chilling system of claim 1, the tundish comprising:
   an outer region lower than a central region, the outer region being bounded by a perimeter edge; and
   a raised rim extending upward from the perimeter edge;
   wherein the outlet ports are positioned near the perimeter edge of the tundish.

3. The cryogenic poultry chilling system of claim 2, the tundish further comprising:
   a baffle corresponding to each outlet port configured and arranged to direct cryogen through the corresponding outlet port as the carousel is rotating.

4. The cryogenic poultry chilling system of claim 2, wherein the outlet ports are substantially evenly spaced along the perimeter edge.

5. The cryogenic poultry chilling system of claim 1, the cryogen delivery apparatus comprising:
   a cryogen degassing tank configured and arranged to receive a mixture of cryogenic liquid and gas and to deliver cryogen by gravity feed substantially as liquid to the tundish.

6. The cryogenic poultry chilling system of claim 1, the carousel further comprising:
   a guide member at each station positioned around at least a portion of the corresponding injector and configured and arranged to maintain the cavity opening of the poultry carcass at each said station aligned with the corresponding injector at each said station.

7. The cryogenic poultry chilling system of claim 2, further comprising:
   an upper rail positioned above the carousel and running substantially parallel to a portion of the perimeter edge of the tundish configured and arranged to support trolleys from which the leg hangers are suspended.

8. The cryogenic poultry chilling system of claim 7, the carousel further comprising:
   a trolley guide positioned below the upper rail and above the tundish rim and having a plurality of perimeter notches configured and arranged to position the trolleys, each notch corresponding to one of the stations, such that the carcass corresponding to each trolley is positioned with its cavity opening aligned with the injector in the corresponding station.

9. The cryogenic poultry chilling system of claim 7, further comprising:
   a lower rail positioned below the upper rail and above the tundish rim and running parallel to the upper rail configured and arranged to guide the leg hangers that are suspended from the trolleys.

10. The cryogenic poultry chilling system of claim 1, further comprising:
    a neck clamping apparatus configured and arranged to at least partially close the neck opening to inhibit loss of cryogen therefrom.

11. A method of chilling poultry using a cryogen and the cryogenic poultry system of claim 1, comprising:
    rotating the carousel at a predetermined speed;
    receiving a poultry carcass at one of the stations such that a cavity opening of the carcass is oriented generally upward and a neck opening of the carcass is oriented generally downward;
    delivering a dose substantially liquid cryogen to an injector corresponding to one of the stations and aligned with the cavity opening of the corresponding carcass; and
    delivering liquid cryogen by gravity from the injector into the carcass through the cavity opening.

12. The method of chilling poultry of claim 11, further comprising:
    controlling the dose by one or both of controlling the flow rate cryogen delivered to the injector and controlling the predetermined speed of rotation of the carousel.

13. The method of claim 11, further comprising:
    prior to delivering a dose of substantially liquid cryogen, degassing cryogen received from a cryogen source.

14. The method of claim 11, further comprising:
    controlling the liquid cryogen delivered to each bird so as to cause at least some liquid cryogen to reach the neck opening, thereby reducing the presence of campylobacter at the neck opening.

* * * * *